US012639762B2

(12) United States Patent
Patton et al.

(10) Patent No.: US 12,639,762 B2
(45) Date of Patent: *May 26, 2026

(54) TRANSACTION HANDLING IN VIEW OF SETTLEMENT FACTOR COMPLIANCE

(71) Applicant: TRETE Inc., Prosper, TX (US)

(72) Inventors: Damien Patton, Plano, TX (US); Christian Gratton, Eaton Rapids, MI (US); Rish Mehta, Castro Valley, CA (US)

(73) Assignee: TRETE Inc., Prosper, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/286,283

(22) Filed: Jul. 31, 2025

(65) Prior Publication Data

US 2025/0356420 A1 Nov. 20, 2025

Related U.S. Application Data

(63) Continuation-in-part of application No. 18/927,608, filed on Oct. 25, 2024, now Pat. No. 12,393,952, (Continued)

(51) Int. Cl.
*G06Q 40/04* (2012.01)
*G06Q 20/40* (2012.01)

(52) U.S. Cl.
CPC .......... *G06Q 40/04* (2013.01); *G06Q 20/407* (2013.01)

(58) Field of Classification Search
None
See application file for complete search history.

(56) References Cited

U.S. PATENT DOCUMENTS

| 10,587,628 B2 | 3/2020 | Setty |
| 11,637,691 B2 | 4/2023 | Venkataramappa |

(Continued)

FOREIGN PATENT DOCUMENTS

| CA | 3062805 A1 | 5/2020 |
| CA | 3173084 A1 | 9/2021 |
| WO | 2019141984 A1 | 7/2019 |

OTHER PUBLICATIONS

Amoussou, Mandela, "What is a Cap Table, and Why are they Important?", from Digital Securities, Published Jan. 10, 2023.

(Continued)

*Primary Examiner* — Matthew S Gart
*Assistant Examiner* — Liz P Nguyen

(57) ABSTRACT

The present invention extends to transaction handling in view of settlement factor compliance. Security action triggers subject pre-settlement transactions to one or more supplemental security actions prior to settlement approval. When it is determined that an identified factor impacts transaction settlement, a flag is set. The flag denotes that pre-settlement transactions associated with specified transaction data are subject to the one or more supplemental security actions prior to settlement. A transaction is reviewed, including interrupting the flow of the transaction and subjecting the transaction to the one or more supplemental security actions. The transaction is allowed to resume and progress towards settlement or is killed based on outcomes of the one or more supplemental security actions.

12 Claims, 19 Drawing Sheets

Related U.S. Application Data which is a continuation-in-part of application No. 18/616,176, filed on Mar. 26, 2024, now Pat. No. 12,361,491.

(60) Provisional application No. 63/615,128, filed on Dec. 27, 2023, provisional application No. 63/615,145, filed on Dec. 27, 2023, provisional application No. 63/615,108, filed on Dec. 27, 2023, provisional application No. 63/615,136, filed on Dec. 27, 2023, provisional application No. 63/600,381, filed on Nov. 17, 2023, provisional application No. 63/596,471, filed on Nov. 6, 2023, provisional application No. 63/515,337, filed on Jul. 24, 2023, provisional application No. 63/509,257, filed on Jun. 20, 2023, provisional application No. 63/509,266, filed on Jun. 20, 2023, provisional application No. 63/509,264, filed on Jun. 20, 2023, provisional application No. 63/509,261, filed on Jun. 20, 2023, provisional application No. 63/454,622, filed on Mar. 24, 2023.

(56) References Cited

U.S. PATENT DOCUMENTS

| | | | |
|---|---|---|---|
| 11,985,263 | B1 | 5/2024 | Liu |
| 2007/0027781 | A1 | 2/2007 | Tripp |
| 2013/0117156 | A1 | 5/2013 | Azmi |
| 2016/0275626 | A1 | 9/2016 | Lee |
| 2016/0321751 | A1* | 11/2016 | Creighton, IV ....... G06Q 40/04 |
| 2017/0103385 | A1* | 4/2017 | Wilson, Jr. ......... G06Q 20/3825 |
| 2017/0109744 | A1 | 4/2017 | Wilkins |
| 2019/0278852 | A1 | 9/2019 | Jayachandran |
| 2020/0013118 | A1 | 1/2020 | Treat |
| 2020/0143372 | A1 | 5/2020 | Liu |
| 2020/0322136 | A1 | 10/2020 | Irazabal |
| 2022/0108315 | A1 | 4/2022 | Gorog |
| 2022/0207509 | A1 | 6/2022 | Hiura |
| 2022/0222657 | A1 | 7/2022 | Nichani |
| 2022/0366494 | A1 | 11/2022 | Cella |
| 2022/0391896 | A1 | 12/2022 | Lei |
| 2023/0245112 | A1 | 8/2023 | De Caro |
| 2024/0046360 | A1 | 2/2024 | Negron |
| 2024/0160703 | A1 | 5/2024 | Lipton |
| 2024/0177150 | A1 | 5/2024 | Guo |

OTHER PUBLICATIONS

Politou, E. et al., "Blockchain Mutability: Challenges and Proposed Solutions", from IEEE Transcations on Emerging Topics in Computing, Published Oct. 25, 2019.

Non-Final Office Action, U.S. Appl. No. 18/616,143, Mailing Date Aug. 9, 2024, 15 pages.

Notice of Allowance, U.S. Appl. No. 18/616,143, Mailing Date Oct. 17, 2024, 8 pages.

Non-Final Office Action, U.S. Appl. No. 18/616,165, Mailing Date Aug. 9, 2024, 11 pages.

Final Office Action, U.S. Appl. No. 18/616,165, Mailing Date Sep. 16, 2024, 13 pages.

Notice of Allowance, U.S. Appl. No. 18/616,165, Mailing Date Dec. 17, 2024, 14 pages.

Non-Final Office Action, U.S. Appl. No. 18/616,176, Mailing Date Sep. 6, 2024, 27 pages.

Final Office Action, U.S. Appl. No. 18/616,176, Mailing Date Nov. 25, 2024, 17 pages.

Non-Final Office Action, U.S. Appl. No. 18/616,176, Mailing Date Feb. 13, 2025, 18 pages.

Notice of Allowance, U.S. Appl. No. 18/616,176, Mailing Date Jun. 10, 2025, 9 pages.

Non-Final Office Action, U.S. Appl. No. 18/927,608, Mailing Date Dec. 19, 2024, 16 pages.

Final Office Action, U.S. Appl. No. 18/927,608, Mailing Date Apr. 1, 2025, 19 pages.

Notice of Allowance, U.S. Appl. No. 18/927,608, Mailing Date Jul. 14, 2025, 9 pages.

Non-Final Office Action, U.S. Appl. No. 18/616,184, Mailing Date Jun. 7, 2025, 16 pages.

Final Office Action, U.S. Appl. No. 18/616,184, Mailing Date Oct. 2, 2024, 9 pages.

Notice of Allowance, U.S. Appl. No. 18/616,184, Mailing Date Jan. 6, 2025, 9 pages.

Notice of Allowance, U.S. Appl. No. 19/040,516, Mailing Date May 28, 2025, 13 pages.

Non-Final Office Action, U.S. Appl. No. 19/040,549, Mailing Date Mar. 27, 2025, 18 pages.

Final Office Action, U.S. Appl. No. 19/040,549, Mailing Date May 14, 2025, 18 pages.

Notice of Allowance, U.S. Appl. No. 19/040,549, Mailing Date Jul. 21, 2025, 9 pages.

* cited by examiner

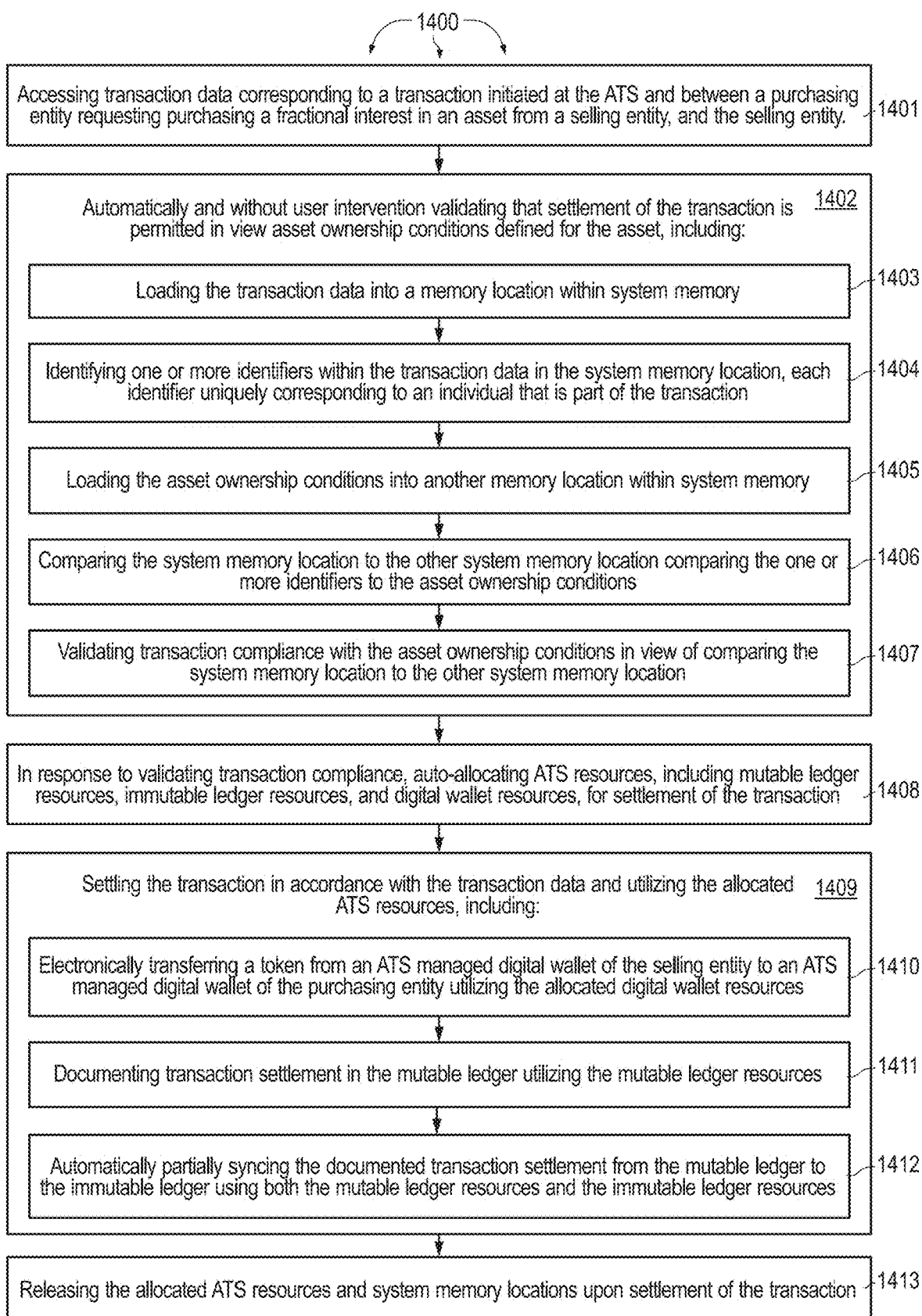

— 1400 —

Accessing transaction data corresponding to a transaction initiated at the ATS and between a purchasing entity requesting purchasing a fractional interest in an asset from a selling entity, and the selling entity. ⎤ 1401

Automatically and without user intervention validating that settlement of the transaction is __1402__ permitted in view asset ownership conditions defined for the asset, including:

Loading the transaction data into a memory location within system memory ⎤ 1403

Identifying one or more identifiers within the transaction data in the system memory location, each identifier uniquely corresponding to an individual that is part of the transaction ⎤ 1404

Loading the asset ownership conditions into another memory location within system memory ⎤ 1405

Comparing the system memory location to the other system memory location comparing the one or more identifiers to the asset ownership conditions ⎤ 1406

Validating transaction compliance with the asset ownership conditions in view of comparing the system memory location to the other system memory location ⎤ 1407

In response to validating transaction compliance, auto-allocating ATS resources, including mutable ledger resources, immutable ledger resources, and digital wallet resources, for settlement of the transaction ⎤ 1408

Settling the transaction in accordance with the transaction data and utilizing the allocated __1409__ ATS resources, including:

Electronically transferring a token from an ATS managed digital wallet of the selling entity to an ATS managed digital wallet of the purchasing entity utilizing the allocated digital wallet resources ⎤ 1410

Documenting transaction settlement in the mutable ledger utilizing the mutable ledger resources ⎤ 1411

Automatically partially syncing the documented transaction settlement from the mutable ledger to the immutable ledger using both the mutable ledger resources and the immutable ledger resources ⎤ 1412

Releasing the allocated ATS resources and system memory locations upon settlement of the transaction ⎤ 1413

FIG. 14

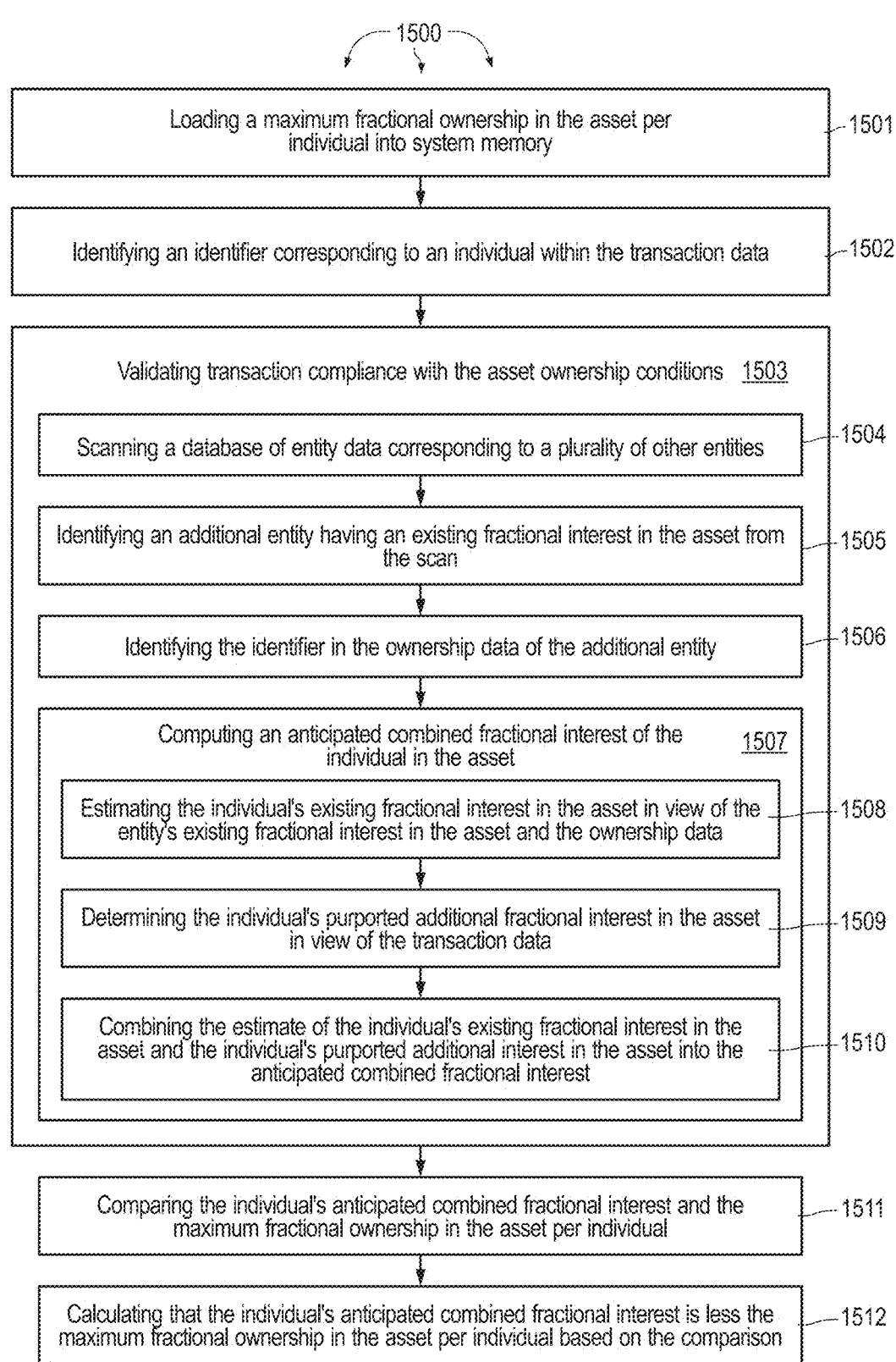

1500

| 1501 | Loading a maximum fractional ownership in the asset per individual into system memory |

| 1502 | Identifying an identifier corresponding to an individual within the transaction data |

Validating transaction compliance with the asset ownership conditions   1503

| 1504 | Scanning a database of entity data corresponding to a plurality of other entities |

| 1505 | Identifying an additional entity having an existing fractional interest in the asset from the scan |

| 1506 | Identifying the identifier in the ownership data of the additional entity |

Computing an anticipated combined fractional interest of the individual in the asset   1507

| 1508 | Estimating the individual's existing fractional interest in the asset in view of the entity's existing fractional interest in the asset and the ownership data |

| 1509 | Determining the individual's purported additional fractional interest in the asset in view of the transaction data |

| 1510 | Combining the estimate of the individual's existing fractional interest in the asset and the individual's purported additional interest in the asset into the anticipated combined fractional interest |

| 1511 | Comparing the individual's anticipated combined fractional interest and the maximum fractional ownership in the asset per individual |

| 1512 | Calculating that the individual's anticipated combined fractional interest is less the maximum fractional ownership in the asset per individual based on the comparison |

FIG. 15

TRANSACTION HANDLING IN VIEW OF SETTLEMENT FACTOR COMPLIANCE

CROSS REFERENCE TO RELATED APPLICATIONS

This application is a continuation in part of U.S. patent application Ser. No. 18/927,608, entitled "Automated Computing Resource Allocation and Comparison Validating Ownership And Transaction Completion", filed Oct. 25, 2024, which is incorporated herein in its entirety That application is a continuation in part of U.S. patent application Ser. No. 18/616,176, now U.S. Pat. No. 12,361, 491, entitled "Settlement And Approval Service", filed Mar. 26, 2024, which is incorporated herein in its entirety.

That application claims the benefit of priority under 35 U.S.C. § 119 from U.S. Provisional Patent Application Ser. No. 63/454,622, entitled "Transaction Platform With Synchronized Semi-Redundant Ledgers," filed on Mar. 24, 2023, all of which is incorporated herein by reference in its entirety for all purposes. That application claims the benefit of priority under 35 U.S.C. § 119 from U.S. Provisional Patent Application Ser. No. 63/509,257, entitled "Data Retrieval and Validation for Asset Onboarding," filed on Jun. 20, 2023, all of which is incorporated herein by reference in its entirety for all purposes. That application claims the benefit of priority under 35 U.S.C. § 119 from U.S. Provisional Patent Application Ser. No. 63/509,261, entitled "Data Validation and Assessment Valuation," filed on Jun. 20, 2023, all of which is incorporated herein by reference in its entirety for all purposes. That application claims the benefit of priority under 35 U.S.C. § 119 from U.S. Provisional Patent Application Ser. No. 63/509,264, entitled "Secure Identifier Integration," filed on Jun. 20, 2023, all of which is incorporated herein by reference in its entirety for all purposes. That application claims the benefit of priority under 35 U.S.C. § 119 from U.S. Provisional Patent Application Ser. No. 63/509,266, entitled "Dual Ledger Syncing," filed on Jun. 20, 2023, all of which is incorporated herein by reference in its entirety for all purposes. That application claims the benefit of priority under 35 U.S.C. § 119 from U.S. Provisional Patent Application Ser. No. 63/515,337, entitled "Metadata Process, with Static and Evolving Attributes, Introduced into Tokenization Standards," filed on Jul. 24, 2023, all of which is incorporated herein by reference in its entirety for all purposes. That application claims the benefit of priority under 35 U.S.C. § 119 from U.S. Provisional Patent Application Ser. No. 63/596,471, entitled "Real Asset Fractionalization Algorithm," filed on Nov. 6, 2023, all of which is incorporated herein by reference in its entirety for all purposes. That application claims the benefit of priority under 35 U.S.C. § 119 from U.S. Provisional Patent Application Ser. No. 63/600,381, entitled "Settlement and Approval Service," filed on Nov. 17, 2023, all of which is incorporated herein by reference in its entirety for all purposes. That application claims the benefit of priority under 35 U.S.C. § 119 from U.S. Provisional Patent Application Ser. No. 63/615,108, entitled "Live Syncing Capitalization Table System," filed on Dec. 27, 2023, all of which is incorporated herein by reference in its entirety for all purposes. That application claims the benefit of priority under 35 U.S.C. § 119 from U.S. Provisional Patent Application Ser. No. 63/615,128, entitled "Transaction Flow with Master Account Ledger and Escrow Ledger Interaction," filed on Dec. 27, 2023, all of which is incorporated herein by reference in its entirety for all purposes. That application claims the benefit of priority under 35 U.S.C. § 119 from U.S. Provisional Patent Application Ser. No. 63/615,136, entitled "Regenerative Model-Continuous Evolution System ("RM-CES")," filed on Dec. 27, 2023, all of which is incorporated herein by reference in its entirety for all purposes. That application claims the benefit of priority under 35 U.S.C. § 119 from United States Provisional Patent Application Ser. No. 63/615,145, entitled "Transaction & Settlement Validation Service ("TSVS")," filed on Dec. 27, 2023, all of which is incorporated herein by reference in its entirety for all purposes.

BACKGROUND

1. Background and Relevant Art

Many computing environments perform (possibly multistage) transactions where data from different computing locations (and potentially associated with different entities) is accessed from computing resources (e.g., system memory and/or durable storage), processed using other computing resources (e.g., processor and/or system memory), and resulting data is moved back to other computing locations using further computing resources (e.g., system memory and/or durable storage) in view of the processing. A multistage transaction can include multiple data access, data processing, and data storage stages, using, and possibly re-using, various computing resources. A transaction can also utilize network resources and system bus resources when accessing, moving, and storing data within a computing environment.

In different computing environments, different transaction processing factors may be more or less relevant when performing transactions. For example, in some computing environments transaction efficiency may be of higher relevance. When transaction efficiency is of higher relevance, a computing environment may be configured with ample resources (and upgraded over time) to mitigate computing resource bottlenecks. In other computing environments, transaction accuracy may be of higher relevance. When transaction accuracy is of higher relevance, a computing environment may be configured with additional processing, such as, more advanced error checking, separate data verification algorithms, human data verification, etc., to minimize inaccuracies. In further computing environments, the appropriateness of allowing transactions or allowing one or more stages within a transaction to occur may be of higher relevance. When transaction and/or transaction stage appropriateness is of higher relevance, a computing environment may be configured with gate keeping/security algorithms and/or human intervention to validate transaction appropriateness.

Within a computing environment, it may also be that a combination of factors has increased relevance when performing transactions. For example, in additional computing environments, a combination of two or even all three of efficiency, accuracy, and appropriateness may be of higher relevance. However, the objectives of different factors can be counter to one another. For example, additional checks and verifications for transaction accuracy can reduce transaction efficiency. Conversely, performing transactions at maximum efficiency can reduce transaction accuracy.

There is some ability to add additional resources to a computing environment to facilitate transaction efficiency and also account for transaction accuracy and transaction appropriateness. However, most, if not all, computing environments have some resource limitations. Over time, or even due to workload spikes, transaction volumes can increase, causing tradeoffs in transaction efficiency relative to transaction accuracy and/or transaction appropriateness. Even when resource upscaling is an option, there may be a time delay in allocating additional computing resources for use. As such, transaction processing within a computing environment may, at least from time to time, degrade with respect to one or more transaction processing factors in view of transaction processing factor tradeoffs.

Some computing environments place transaction guidelines or even transaction requirements with respect to the described transaction processing factors as well as other transaction processing factors. For example, a computing environment can encourage or require transactions to complete within a specified period of time (e.g., some number of milliseconds) with a specified accuracy. Transaction guidelines and/or transaction requirements can be set by individuals, corporations, government entities, etc.

For example, a corporation may set transaction guidelines for customer retention. The corporation may set transaction guidelines knowing the potential for customer loss increases when the transaction guidelines are not satisfied, either for individual transactions or over time. A government entity can set transaction requirements. Failure comply with government entity transaction requirements may result in sanctions.

SUMMARY

Examples extend to methods, systems, and computer program products for transaction handling in view of settlement factor compliance.

In some aspects, a system processes transaction flows settling transactions. A set of security action triggers is maintained and updated. Each security action trigger, if triggered, subjects pre-settlement transactions to one or more supplemental security actions prior to settlement approval. Maintaining and updating security action triggers includes tracking order frequency, timing, aggregate value and user attributes based on a set of factors. The factors can include: (1) a mid settlement consideration factor and (2) one or more "outside" factors selected from among: a significant regional incident, a significant national incident, a significant global incident, and government regulation affecting an asset value.

Continual checks for non-compliance with the mid settlement consideration factor and an "outside" factor, from among the one or more "outside" factors, occur. Non-compliance with a factor, from among: the mid settlement consideration factor and the "outside" factor, is detected from the checking. It is determined that the identified factor impacts pre-settlement transactions associated with specified transaction data in view of the tracked order frequency, timing, aggregate value, and user attributes. Responsive to determining that the identified factor impacts pre-settlement transactions associated with the specified transaction data, a flag is set. The flag denotes that pre-settlement transactions associated with the specified transaction data are subject to the one or more supplemental security actions prior to settlement.

Concurrently with processing transaction flows settling transactions and updating and maintaining the set of security action triggers, a pre-settlement transaction is reviewed in response to triggering a security action trigger. Reviewing the pre-settlement transaction includes monitoring flow of the pre-settlement transaction including transaction data defining exchange of a fractional interest in an asset between a buyer and a seller. Reviewing the pre-settlement transaction includes matching the transaction data with the specified transaction data.

In response the match, the flow of the transaction is interrupted from progressing towards settlement. While interrupted, the transaction is subjected to the one or more supplemental security actions in view of the set flag. The one or more supplemental security actions handle any transaction irregularities associated with the identified factor. The transaction is allowed to resume or is killed based on the one or more supplemental security actions.

In other aspects, a system accesses transaction data corresponding to a transaction between a purchasing entity and a selling entity. A set of security action triggers is updated and maintained. Each security action triggers in the set of security actions triggers, when triggered, subject pre-settlement transactions to one or more supplemental security actions. Subjecting pre-settlement transactions to one or more supplemental security actions includes checking for a mid settlement consideration factor and one or more "outside" factors impacting transactions at the ATS.

A factor, from among: the mid settlement consideration factor and the one or more "outside" factors, is identified as occurring from checking. It is determined the identified factor impacts pre-settlement transactions associated with specified transaction data. Responsive to determining that the identified factor impacts pre-settlement transactions associated with the specified transaction data, a flag is set. The flag denotes that pre-settlement transactions associated with the specified transaction data are subject to the one or more supplemental security actions prior to settlement.

Concurrently with processing transaction flows settling transactions updating and maintaining the set of security action triggers, the transaction is reviewed in response to triggering a security action trigger. Transaction review includes monitoring flow of the transaction pre-settlement and including live transaction data defining exchange of fractional interest in an asset between the purchasing entity and the selling entity. Transaction review also includes matching the live transaction data with the specified transaction data and interrupting flow of the transaction towards settlement.

Subsequent to interrupting the flow of the transaction, it is validated that the transaction complies with asset ownership conditions defined for the asset by subjecting the transaction to the one or more supplementing security actions. In response to validating transaction compliance, resources, including mutable ledger resources, immutable ledger resources, and digital wallet resources, are allocated for settlement of the transaction. The transaction is settled in accordance with the transaction data and utilizing the allocated resources.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 14 illustrates a flow chart of an example method for automated computing resource allocation and comparison validating ownership and transaction completion.

FIG. 15 illustrates a flow chart of an example method for automated computing resource allocation and comparison validating ownership.

DETAILED DESCRIPTION

Figure 1:
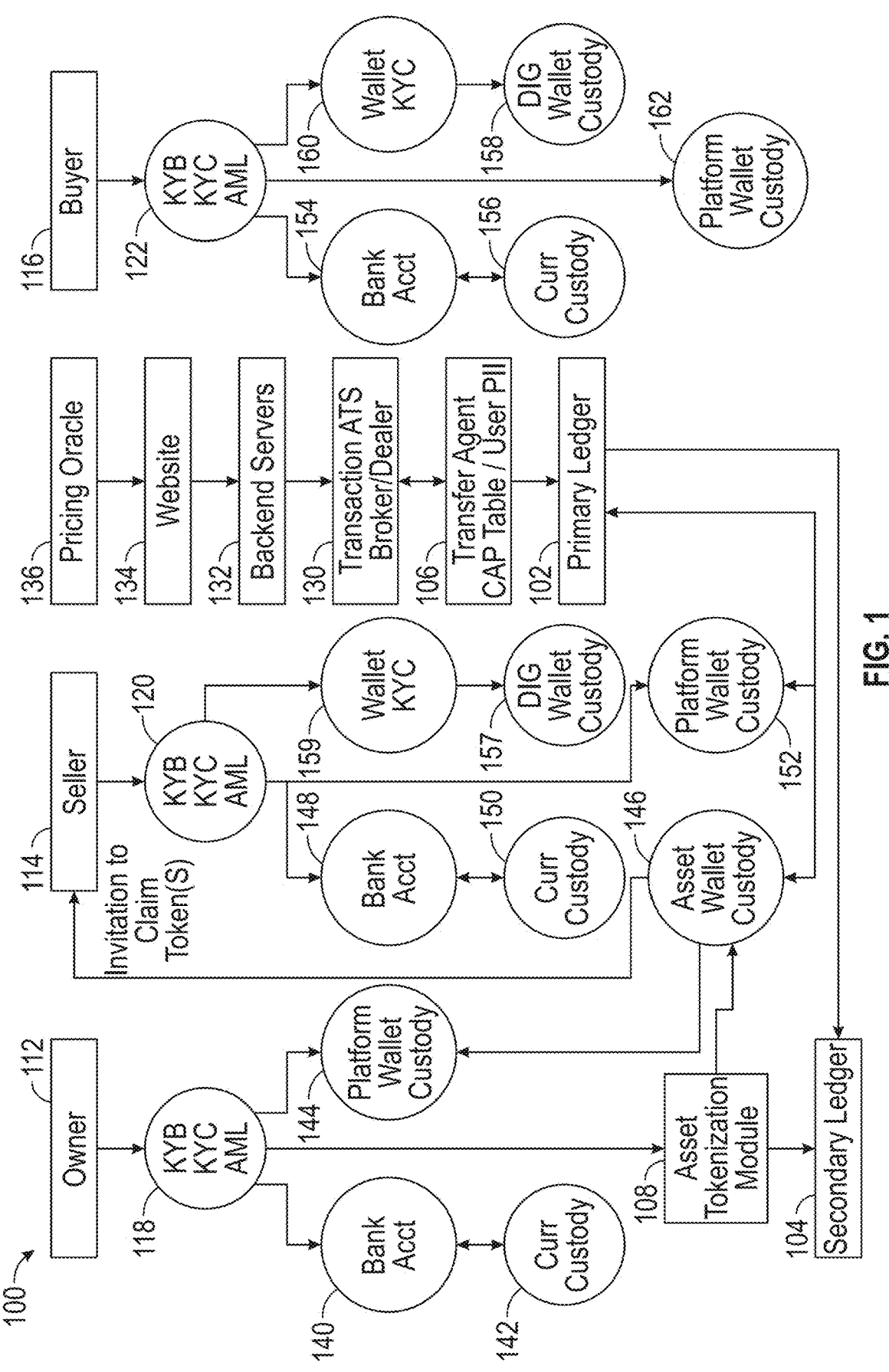
FIG. 1 illustrates an example transaction system including semi-redundant ledgers.

Examples extend to methods, systems, and computer program products for transaction handling in view of settlement factor compliance.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

A transaction monitor accesses transaction data corresponding to a transaction initiated at an Alternative Trading System (ATS). The transaction is between a purchasing entity, requesting purchasing a fractional interest in an asset from a selling entity, and the selling entity. Automatically and without user intervention, the transaction monitor validates that settlement of the transaction is permitted in view asset ownership conditions defined for the asset.

Transaction settlement validation includes loading the transaction data into a memory location within system memory. Transaction settlement validation includes identifying one or more identifiers within the transaction data in the system memory location. Each identifier uniquely corresponds to an individual that is part of the entity. Transaction settlement validation includes loading the asset ownership conditions into another memory location within system memory. Transaction settlement validation includes comparing the system memory location to the other system memory location comparing the one or more identifiers to the asset ownership conditions. Transaction settlement validation includes validating transaction compliance with the asset ownership conditions in view of comparing the system memory location to the other system memory location.

In response to validating transaction compliance, ATS resources, including mutable ledger resources, immutable ledger resources, and digital wallet resources, are automatically allocated for settlement of the transaction. The transaction is settled in accordance with the transaction data and utilizing the allocated ATS resources. Transaction settlement includes electronically transferring a token from an ATS managed digital wallet of the selling entity to an ATS managed digital wallet of the purchasing entity utilizing the allocated digital wallet resources. Transaction settlement includes documenting transaction settlement in the mutable ledger utilizing the mutable ledger resources. Transaction settlement includes automatically partially syncing the documented transaction settlement from the mutable ledger to the immutable ledger using both the mutable ledger resources and the immutable ledger resources.

The allocated ATS resources and at least one of the system memory locations and the other system memory location are released upon settlement of the transaction.

In one aspect, transaction settlement validating includes the transaction monitor monitoring other ATS resources handling initiated transactions at the ATS. The transaction monitor detects the transaction between the purchasing entity and the selling entity is an initiated transaction at the ATS based on the monitoring. The transaction monitor automatically, without user intervention, and in response to detecting the transaction is an initiated transaction, intercepts the transaction data at the other ATS resources. The transaction monitor pauses settlement of the transaction. The transaction monitor further automatically unpausing settlement of the transaction in response to validated transaction compliance.

When a transaction is paused, resources allocated to the transaction can be held for the transactions. The held resources can resume being utilized when the transaction is unpaused, facilitating more efficient transaction settlement.

FIG. 1 illustrates an example transaction system 100 including semi-redundant ledgers (primary ledger 102 and secondary ledger 104).

In aspects, system 100 is an Alternative Trading System (ATS). System 100 may automatically create and dynamically update (e.g., maintain) capitalization tables of assets underlying exchanged tokens, thereby addressing a long-standing pain point in businesses having investors for whom such capitalization tables must be manually created and revised whenever ownership changes occur. The automatic creation and live syncing maintenance of capitalization tables may facilitate their being continually up to date, complete, verified, and audit-ready (e.g., dynamically updated).

For example, system 100 may provide owners with a list of new investors in a tokenized asset based on the updated capitalization table, reflecting every buyer of the investors' tokens representing an interest in the underlying asset. System 100 may also provide value to the transfer side via improved efficiency and the reduction of manual pain points in their business. The ease and simplicity with which the systems and methods described herein may be applied in practice may provide compelling inducements for industries traditionally slow to adopt new technology, e.g., commercial real estate, to adopt the technology disclosed herein for facilitating transaction processing for the benefit of buyers and sellers of digital assets representing fractional ownership in underlying assets, system 100, sponsors of investments in assets and/or owners of assets (e.g., real estate) may provide access to investments in such assets which may have previously been unavailable, for example, due to securities regulations and/or rules defining sophisticated and accredited investors.

Retail investors and buyers of assets have traditionally been locked out of participating in commercial real estate investments because they lack the minimum investment threshold and/or do not have sufficient qualifications as traditional investors to acquire an interest in an asset from a Seller of the interest in the asset. System 100 may establish a secondary exchange via which the asset tokens are exchanged in secondary trades, following any holding periods following the primary issuance of securities underlying the asset tokens as may be required by securities regulations (e.g., Rule 144), so the restrictions of the securities regulations pertaining to qualifications of the investors may not apply to the contemplated exchange of asset tokens. For example, system 100 may unlock real estate investment opportunities for retail buyers, not only facilitating retail buyers to capture return on investment, but also to take advantage of potential tax savings, for example, via write-offs of depreciation of the underlying assets on tax returns.

The disclosed technology can create digital securities out of what are known as "real assets" and can function as a secondary market platform or Financial Exchange for these types of assets as well as for other types of assets such as, but not limited to, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, and any other types of appropriate assets.

As depicted, system 100 includes owner 112, seller 114, and buyer 116. Each of owner 112, seller 114, and buyer 116 may include computing and communication resources and systems (e.g., an owner device, a seller device, and a buyer device, respectively) corresponding to and/or representing users interfacing with system 100. Owner 112 may be an owner of an asset listed on the transaction platform and/or a sponsor of investments in an asset listed on the transaction platform, and may also be referred to as an asset owner or a property owner.

Seller 114 may represent one who is selling or listing an asset as available for sale or exchange, e.g., available to be transferred to another user in exchange for something else (e.g., tokens, currency, etc.). Seller 114 may also be referred to as a seller when participating in a buy-sell transaction, for example.

Buyer 116 may represent one who is seeking to purchase, buy, or acquire at least a partial interest in an asset which is listed (e.g., as available for sale or exchange) on the transaction platform. Buyer 116 may also be referred to as a buyer when participating in a buy-sell transaction, for example.

System 100 may perform verification of identification and related information for each of the users of the system 100 (e.g., including owner 112, seller 114, and/or buyer 116) via an online identity verification process, for example, a know your customer (KYC) verification process for an individual user, a know your business (KYB) verification process for any business entity, such as, but not limited to, limited liability company (LLC), C corporation, S corporation, and other appropriate business entities, and/or an anti-money laundering (AML) verification process.

Each user of the system 100 may communicatively couple an electronic and/or computer-networked funding source and/or recipients of funds (e.g., financial institution account, bank account, credit union account, investment account, cryptocurrency account, digital wallet, and/or other provider or recipient of digital representations of currency and/or digital assets associated with a transaction processed by the transaction platform) to system 100. Digital assets may include, but is not limited to, cryptocurrencies, crypto tokens, crypto coins, security token, asset tokens, non-fungible tokens (NFTs), fungible tokens, and/or other appropriate forms of digital assets. The electronic and/or computer-networked funding source and/or recipients of funds may include a computing system of one or more third-party accounts of users of the system 100.

Sending and/or distributing fees and/or funds, receiving and/or collecting fees and/or funds, and exchanging assets for fees and/or funds as described herein may merely be illustrative examples of the technological systems and methods described herein which may be applied in addressing challenges in a variety of other contexts and applications, also. For example, the technological systems and methods described herein may provide novel systems and methods for transmitting and/or receiving transmissions of various types of digital content (e.g., digital bits and/or bytes storable in a computer-readable memory of the system 100) over a computing communication system associated with the system 100. In various non-limiting examples, including those described herein, the digital content transmitted and/or received by components of the systems and methods described herein may include digital representations of currency, cryptocurrency, NFTs, and/or digital assets such as written works, artwork, photographs, audio/video programs, music, digital blueprints, computer-aided design (CAD) files representing physical articles of manufacture, architectural designs, plats of survey, deeds to real property, stock and/or membership interests in business entities, executed contracts, ownership and/or membership interests in timeshare properties, co-op properties, travel/vacation clubs, recreational clubs, social clubs, etc. Additional examples of content could be valuation estimates, third party appraisals, proof of purchases, copies of insurance policies, profit and loss data, calendars and schedules, and performance data.

System 100 may include primary ledger 102 (e.g., a private mutable ledger), secondary ledger 104 (e.g., a public immutable ledger), transfer agent 106, asset tokenization module 108, backend servers 132, website 134, and pricing oracle 136. While primary ledger 102 and transfer agent 106 are depicted as separate, it should be understood that, in certain aspects, primary ledger 102 and transfer agent 106 are included within the same service. The users may interact with website 134 via a web browser app executing on computing devices of owner 112, seller 114, and buyer 116, all of which can be, but is not limited to, a desktop computer, laptop computer, tablet computer, personal digital assistant (PDA), cell phone, mobile phone, smart phone, and/or other computing devices including mobile devices.

Website 134 can transfer user-interface data to and/or from computing devices corresponding to owner 112, seller 114, and buyer 116. Web browser apps at computing devices corresponding to owner 112, the seller 114, and the buyer 116 can process the user-interface data and present a corresponding user-interface. The user-interface data and user-interfaces can be tailored per user based on how a user is participating in a transaction, such as, for example, as an owner, a seller, or a buyer. For example, a seller and a buyer may get different user-interfaces, one user-interface with data relevant to selling a fractional interest in an asset and another user-interface with data relevant to purchasing the fractional interest in the asset respectively.

System 100 may be communicatively coupled with transaction ATS broker/dealer module 130, pricing oracle 136, and secondary ledger 104. While, in some aspects, primary ledger 102 is described as being centralized and secondary ledger 104 as being decentralized (e.g., distributed), it should be understood that primary ledger 102 could be decentralized. Primary ledger 102 and/or secondary ledger 104 may be implemented with blockchain technology. Primary ledger 102 and secondary ledger 104 may be private or public. Primary ledger 102 and secondary ledger 104 may include multiple copies of ledgers maintained on different computing nodes of computing networks implementing and/or supporting one or more public blockchain protocols, for example, but not limited to, Ethereum, Bitcoin, Binance Smart Chain (BSC), Cardano, Polkadot, Solana, Chainlink, Cosmos, TRON, HIVE, Polygon (Matic Network), and more.

In certain aspects, primary ledger 102 can store user personally identifiable information (PII) utilized by the system 100, as well as a capitalization table (also referred to as a cap table). The capitalization table maintains the status of platform assets and transactions, including the capitalization of each asset (e.g., real property) listed on the platform (e.g., listed as available for transactions on the platform). Primary ledger 102 may be implemented as a Structured Query Language (SQL) or other database, for example.

In some aspects, primary ledger 102 is maintained by transfer agent 106. The function of transfer agent 106 may be unregulated. Transfer agent 106 can record transactions and/or transaction data in primary ledger 102. Transactions and/or transaction data in primary ledger 102 can be (e.g., automatically) semi-redundantly synchronized to secondary ledger 104. For example, transfer agent 106 can (e.g., semi-redundantly) synchronize primary ledger 102 and secondary ledger 104. In some aspects, semi-redundant synchronization occurs automatically in accordance with synchronization rules, such as, for example, removing PII prior to synchronization. Further, transfer agent 106 may act as a gatekeeper and share information regarding transactions on primary ledger 102 and/or secondary ledger 104 only with authorized users and/or transaction ATS broker/dealer module 130.

In combination, primary ledger 102 and/or secondary ledger 104 can be utilized to automatically and digitally preserve evidence of transaction completion. Upon transaction completes, transaction related data can be (automatically) recorded to primary ledger 102 (e.g., a private mutable ledger). At least a subset of the transaction related data can be semi-redundantly (and automatically) synchronized from primary ledger 102 to secondary ledger 104 (e.g., a public immutable ledger, such as, a block chain).

Transaction ATS broker/dealer module 130 may include computing and communication resources and systems corresponding to and/or representing a registered broker, registered dealer, registered broker/dealer licensed by the US Securities and Exchange Commission (SEC), the Financial Industry Regulatory Agency (FINRA), other domestic/international regulatory or governmental agencies, and/or similar roles in various exemplary applications and/or jurisdictions in which the system 100 is utilized. Transaction ATS broker/dealer module 130 may interface with the system 100 to provide associated broker/dealer functionality on system 100.

Functionality provided by the transaction ATS broker/dealer module 130 may be separate from functionality provided by other modules of system 100, for example, due to regulatory requirements including those promulgated by the Financial Industry Regulatory Authority (FINRA). In one aspect, transaction ATS broker/dealer module 130 may include an Alternative Trading System (ATS) and implementations (e.g., software, firmware, programmable logic arrays, electronic circuitry, etc.) of FINRA-compliant processes and methods for facilitating the transactions processed by the transaction platform as approved and licensed by FINRA.

Compliance with FINRA, SEC, and other government regulations/conditions/flags may be required at system 100 for transactions to be initiated, proceed through various stages, and settle.

Functionality provided by transaction ATS broker/dealer module 130 may be implemented in a virtual private cloud separate from other modules of system 100. Firewalls may be established for transaction ATS broker/dealer module 130 to be separate from and/or on a separate web services instance than other modules of system 100. Transaction ATS broker/dealer module 130 may provide functionality to introduce buyers 116 and sellers 114 to each other, to present user-interfaces, to allocate resources, to release allocated resources, to generate smart contracts, to settle transactions facilitated by the transaction platform, to distribute fees associated with the transactions facilitated by the transaction platform to appropriate participants in system 100, and/or to act as a gatekeeper of transactions facilitated by the transaction platform.

Smart contracts are digital contracts that automatically execute, control or document events and actions according to the terms of a contract or an agreement. Fees generated from activities on system 100 during an acquisition/transfer transaction (e.g., buy-sell transaction, acquisition transaction, merger transaction, etc.) may be collected and/or distributed by transaction ATS broker/dealer module 130, for example, according to rules, agreements, and/or smart contracts associated with the transaction facilitated by the transaction platform. Fees generated from activities and/or participants of system 100 outside transaction ATS broker/dealer module 130 (e.g., from other participants of the transaction platform and/or any third-party system that is not included in system 100) may be processed and collected by components of system 100.

Transaction ATS broker/dealer module 130 may request payment of fees (e.g., fees associated with a transaction facilitated by components of system 100) via third-party custody account(s) of the buyer 116. Transaction ATS broker/dealer module 130 may deduct funds sufficient to cover the fees from proceeds of the transaction to pay seller fees (e.g., fees payable to the seller 114) as stipulated by and/or agreed to by the seller 114 in a smart contract associated with the transaction as part of a process of listing a token as available for an exchange transaction facilitated by system 100.

A computing system of the third-party custody account(s) may send funds to cover the fees to transaction ATS broker/dealer module 130 at which time transaction ATS broker/dealer module 130 may keep the funds covering the fees. Transaction ATS broker/dealer module 130 may disburse funds covering a licensing fee for system 100 to one or more entities due those fees. Transaction ATS broker/dealer module 130 may disburse funds covering a partnership fee to the transfer agent 106. Transaction ATS broker/dealer module 130 may generate and/or distribute a final settlement statement to the buyer 116 and seller 114. In the event of any errors, omissions, glitches, or problems associated with the transaction processed by system 100, transaction ATS broker/dealer module 130 may notify a designated third party of the event for appropriate remediation. Transaction ATS broker/dealer module 130 may include one or more maintenance and support modules via which remediation, updates, upgrades, and/or support may be provided via a third-party computing system communicatively coupled with transaction ATS broker/dealer module 130.

Pricing oracle 136 may include a third-party service that connects smart contracts formulated in system 100 with third-party entities and third-party systems outside of system 100. Pricing oracle 136 may provide a user of system 100 with an estimate of the current value of an asset. Pricing oracle 136 may facilitate calculations and computations based on the estimate as directed by the user. The user may modify inputs to pricing oracle 136 to utilize pricing oracle 136 for determining the user's own market pricing estimates. For example, buyer 116 may modify inputs to pricing oracle 136 to utilize pricing oracle 136 for estimating a future value of their investment in an asset and determining an amount of funds buyer 116 may agree to exchange for the asset on a given day. Seller 114 may transmit information indicating agreement with pricing data provided by pricing oracle 136, or seller 114 may transmit information that overrides the pricing data provided by pricing oracle 136. For example, in the context of commercial real estate assets, pricing oracle 136 may include a digital broker opinion of value (BOV).

In an example, owner 112 (e.g., a real estate property owner) may authenticate with system 100 according to KYB KYC AML 118 protocols and methodologies. Owner 112 may link bank account 140 and currency custody module 142 to system 100. Currency custody module 142 may serve as a custodian for owner 112's currency on system 100. Currency custody module 142 may be configured to hold fiat currency, for example, US dollars ($) or other forms of fiat currency. Platform digital wallet custody module 144 may serve as a custodian for owner 112's digital assets on system 100.

In the example, seller 114 may authenticate with system 100 according to KYB KYC AML 120 protocols and methodologies. In some examples, owner 112 and seller 114 may be the same individual or entity playing the different roles in a transaction, while in other examples, owner 112 and seller 114 may be different individuals or entities, for example, if seller 114 is a broker or agent engaged by owner 112 to list and/or transfer the property on system 100 on their behalf. Seller 114 may link bank account 148 and currency custody module 150 to system 100. Currency custody module 150 may serve as a custodian for seller 114's fiat currency on system 100.

Digital wallet custody module 157 may serve as a custodian for seller 114's digital assets on system 100. These digital assets may include cryptocurrency, e.g., USDC tokens and any other crypto currencies. Digital wallet custody module 157 may authenticate with system 100 according to wallet KYC 159 protocols and methodologies. Digital wallet custody module 157 may also include functionality and/or an interface to convert or exchange the digital currency held thereby into fiat currency for the benefit of seller 114. Conversions or exchanges of the cryptocurrency held by digital wallet custody module 157 to fiat currency may be documented by a transaction entry in primary ledger 102 and/or secondary ledger 104. Platform digital wallet custody module 152 may serve as a custodian for seller 114's digital assets on system 100, including digital assets which seller 114 transfers on behalf of a separate owner (e.g., via a broker or agency relationship) and the digital assets which seller 114 transfers on its own behalf as also owner 112 of the digital assets.

Asset tokenization module 108 may generate one or more digital assets representing an asset and/or a value of an asset, for example, a real estate property owned by owner 112, and store the generated digital assets in asset wallet custody module 146. Asset wallet custody module 146 may transmit data to and/or recording generation of data assets at primary ledger 102 and/or secondary ledger 104. Asset wallet custody module 146 may transmit the digital assets to owner 112's platform digital wallet custody module 144 and provide data to transfer agent 106 to record in the primary ledger 102 regarding the creation and/or transfer of the digital assets generated by asset tokenization module 108. Data recorded to primary ledger 102 can be (e.g., automatically) semi-redundantly synchronized to secondary ledger 104.

Asset wallet custody module 146 may transmit an invitation to seller 114 to claim the digital assets (e.g., a fractional interest in a real asset) generated by asset tokenization module 108. When seller 114 claims or retrieves its associated portion of the digital assets generated by asset tokenization module 108 that is stored in asset wallet custody module 146, for example, if seller 114 is going to trade its associated portion of the digital assets generated by asset tokenization module 108 on system 100, then asset wallet custody module 146 may transmit the digital assets to seller 114's platform digital wallet custody module 152 and transmit information regarding the transfer to transfer agent 106 for recording on the primary ledger 102 (with, for example, automatic, semi-redundant synchronization to secondary ledger 104). In some aspects, instead of transmitting an invitation to seller 114, asset wallet custody module 146 can transmit the digital assets generated by asset tokenization module 108 directly to seller 114's asset wallet custody module 146.

In an example, buyer 116 may authenticate with system 100 according to KYB KYC AML 122 protocols and methodologies. Buyer 116 may link bank account 154 and currency custody module 156 to system 100. Currency custody module 156 may serve as a custodian for buyer 116's fiat currency on system 100. Digital wallet custody module 158 may serve as a custodian for buyer 116's digital assets on system 100. These digital assets may include cryptocurrency, e.g., USDC tokens and any other crypto currencies. Digital wallet custody module 158 may authenticate with system 100 according to wallet KYC 160 protocols and methodologies. Digital wallet custody module 158 may also include functionality and/or an interface to convert or exchange the digital currency held thereby into fiat currency for the benefit of buyer 116. Conversions or exchanges of the cryptocurrency held by digital wallet custody module 158 to fiat currency may be documented by a transaction entry in primary ledger 102 and then automatically (semi-redundantly synchronized) secondary ledger 104. Platform digital wallet custody module 162 may serve as a custodian for buyer 116's digital assets on system 100, for example, shares in tokenized assets generated by asset tokenization module 108.

In an example, buyer 116 may see (e.g., in a presented user-interface) that seller 114 has listed one or more digital assets (e.g., a fractional interest in a real asset) for sale. The one or more digital assets may have been generated by asset tokenization module 108 and stored in asset wallet custody module 146. In one aspect, the one or more digital assets are listed on website 134 that is accessed by buyer 116.

Buyer 116 can engage in a transaction to purchase the one or more digital assets. The transaction can be processed by system 100 to exchange currency via currency custody module 156 and/or digital assets via digital wallet custody module 158 for the one or more digital assets generated by asset tokenization module 108, and, for example, representing the fractional interest in the real asset in which buyer 116 is interested. Seller 114 may receive currency and/or digital assets (e.g., crypto currency) from buyer 116's currency custody module 156 and/or digital wallet custody module 158. Buyer 116 may receive the one or more digital assets, representing the fractional interest in the real asst, from seller 114's platform digital wallet custody module 152, into buyer 116's platform digital wallet custody module 162. Evidence regarding the transfer and settlement of the transaction can be transmitted to and recorded on primary ledger 102 as well as on secondary ledger 104. In one aspect, data is recorded on primary ledger 102 and subsequently semi-redundantly synchronized to secondary ledger 104.

Figure 2:
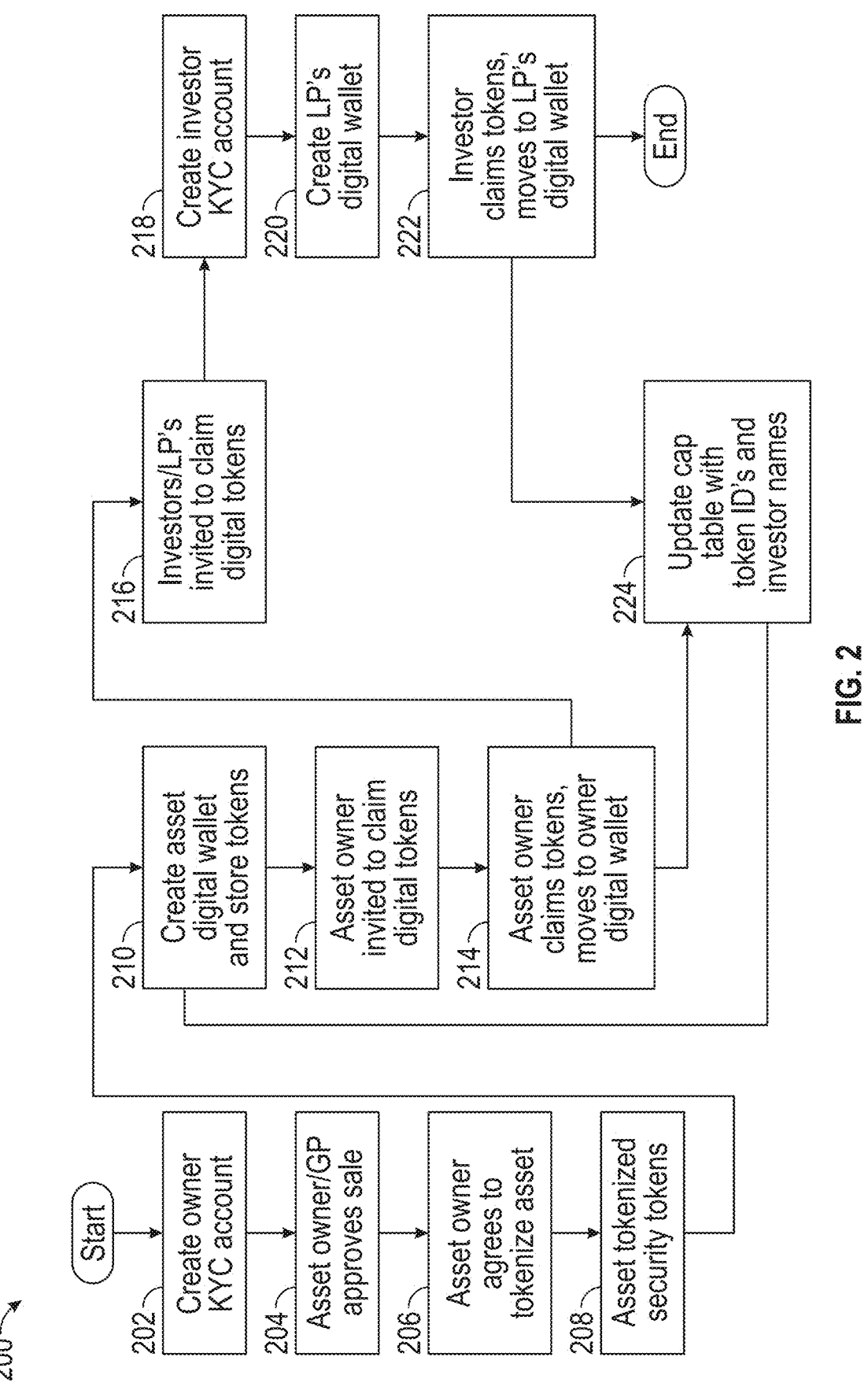
FIG. 2 illustrates an example process for tokenization of an asset.

FIG. 2 illustrates an exemplary process 200 for tokenization of an asset, according to some aspects of the disclosed technology. Process 200 can be implemented using the components of system 100. For example, one or more tokens can be created, each token representing a fractional interest in an asset. There are at least two types of participants in process 200. One is an owner, (e.g., an asset holder), such as the owner 112, who may also be referred to as a sponsor or general partner (GP). The other is an investor, also referred to as a limited partner (LP). The investor may be a current investor in the asset or an investor who wants to invest in the asset. The investor may also be referred to as the buyer, such as buyer 116.

Initially (e.g., at or prior to "START"), the participants (e.g., users) may be onboarded with system 100 as discussed with reference to FIG. 1, and process 200 that the participants undergo to become onboarded with system 100 is described in detail below. For example, the owner (e.g., may be GP) may undergo a KYB process and a KYC account for owner 112 may be created with system 100 (operation 202). Owner 112 may approve sale of the asset using the system 100 (operation 204) to generate a smart contract memorializing agreement to sell and list.

After owner 112 agrees to tokenize (fractionalize interests in) an asset (operation 206), system 100 may tokenize the asset as security tokens (operation 208), for example, or as other digital assets including, but is not limited to, nonfungible tokens (NFTs), fungible tokens, hybrid tokens, cryptocurrencies, crypto tokens, crypto coins, security token, and asset tokens, having metadata including identification information of the buyer of the NFTs. The security tokens may include, for example, ERC 1400 tokens. The security tokens may be fungible tokens or non-fungible tokens, which are unique and differentiated from other tokens representing a share of value in the asset, and may store associated meta data. In various examples, other digital asset types may be used. The security tokens created may include tokens designated as being owned by the GP and tokens owned by each of the investors or LPs who also hold an interest in the asset.

In the example of FIG. 2, an asset having a net value of $1,000,000 may be tokenized as 1,000 tokens, each token having a value of $1,000. In this example, the net value of the asset may be taken into account any debt by which the asset is burdened. In other words, an asset having a market value of $2,000,000, and a mortgage securing a debt of $1,000,000 recorded as a lien against the asset, may have a net value of $1,000,000. An asset having a market value of $1,000,000, and no debt against the asset, may have a net value of $1,000,000.

These tokens may be sent by transfer agent 106 to a platform digital wallet, such as platform digital wallet custody module 152, created for the asset (operation 210), and the capitalization table for the asset may be updated by transfer agent 106 to reflect moving the tokens (operation 224). An identification number (ID) identifying the unique tokens may be included in the capitalization table along with the token's owner or investor's identification information. The platform digital wallet may be held by system 100 or a third party.

System 100 may invite the GP to claim the tokens (operation 212). When the GP claims the tokens, they may be moved from the platform wallet to the GP's digital wallet (operation 214), and the capitalization table may be updated to reflect the move (operation 224). The tokens claimed by the GP are only the GP's tokens, not investors' (LP's) tokens. The GP may then invite the investors (LPs) to claim their tokens (operation 216). Once the LPs claim their tokens, the LPs may be free to conduct transactions on system 100 using the tokens, for example, transferring their tokens or exchanging their tokens for other items of value, for example, other tokens representing interests in other assets.

If an LP who wishes to claim their tokens is not registered or onboarded onto system 100, the LP may undergo a KYC process to create an investor account with the platform on the system 100 (operation 218) and create the LP's digital wallet (operation 220). The LPs may then claim their tokens, which may then be moved from the platform asset digital wallet (which may have been holding the tokens since they were created in operation 208) to the LP wallets (operation 222), and the capitalization table may be updated to reflect the moves (operation 224). For example, the capitalization table may associate the token identifiers (IDs) with the names of the LPs.

When the capitalization table is updated (operation 224), system 100 can record the updated capitalization table may be updated in primary ledger 102 and/or secondary ledger 104 (blockchain). In one aspect, system 100 records an updated capitalization table to primary ledger 102. The system 100 may also automatically update (e.g., semi-redundantly synchronize) secondary ledger 104 to correspond with primary ledger 102. PII about the GP or LPs may be withheld from and not stored in secondary ledger 104. For example, instead of an LP name, the secondary ledger may associate token IDs with a hash value that is unique to the LP. In this manner, a blockchain transaction at secondary ledger 104 may be linked to the LP, while the LP may remain anonymous. The primary and secondary ledgers 102, 104 may be correlated using a database within system 100.

Figure 3:
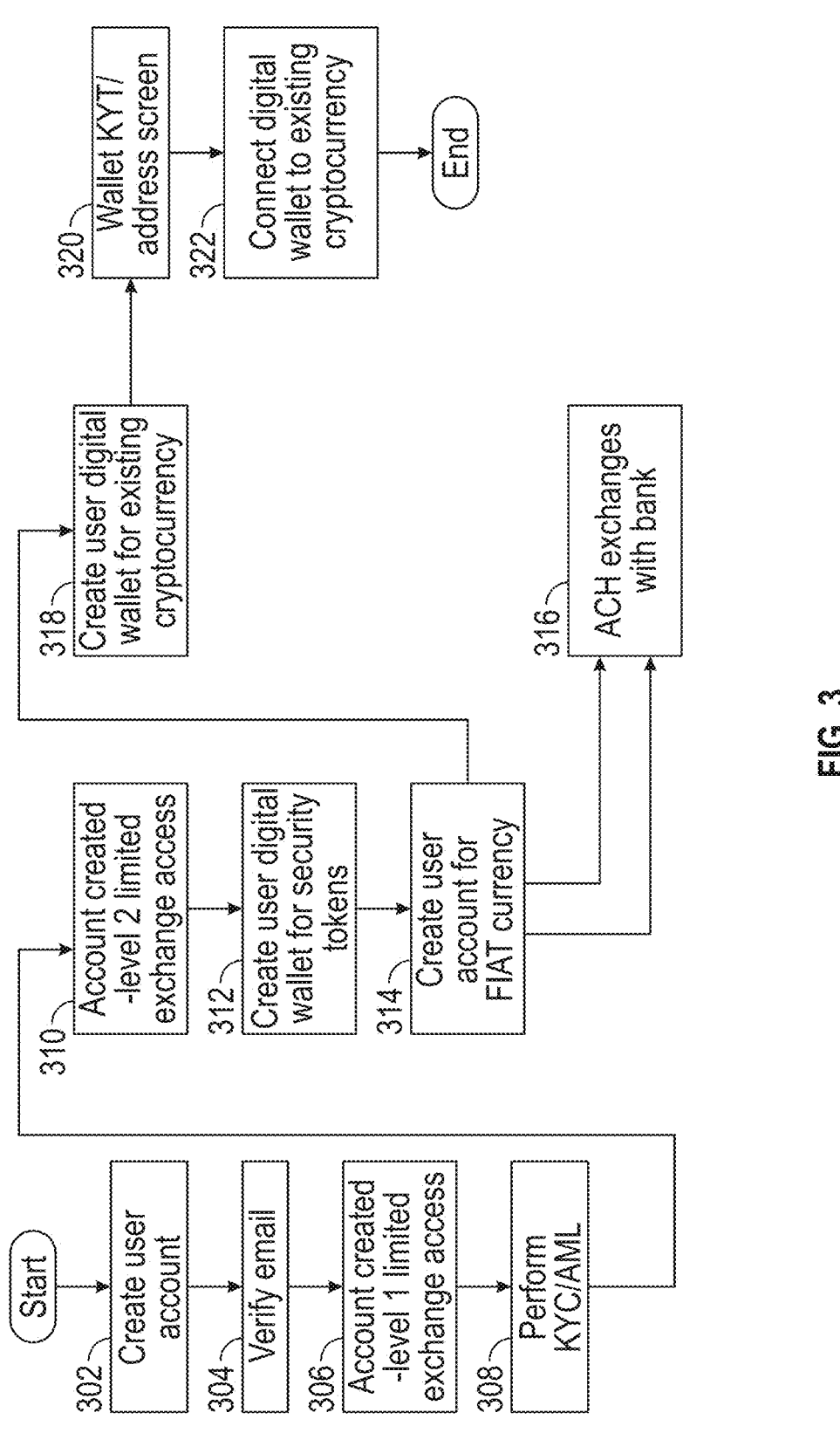
FIG. 3 illustrates an example process for user onboarding and account creation.

FIG. 3 illustrates an exemplary process 300 for user (e.g., owner 112, seller 114, or buyer 116) onboarding and account creation, according to some aspects of the disclosed technology. Process 300 can be implemented using the components of system 100 For a new user, e.g., the owner 112, seller 114, or buyer 116, system 100 may first perform a light account creation with the user's name, email address, and password (operation 302). System 100 may then verify the user's email address (operation 304), for example, by emailing a verification link to the user's email address, which the user may click or follow to verify the user's email address with the platform.

After successful email verification, system 100 may perform a level 1 account creation for the user (operation 306).

The level 1 account may provide limited access to system 100, for example, authorizing the user to browse tokenized assets, but not to acquire or exchange the tokens created to represent the tokenized assets.

A user may gain level 2 access by successfully completing the KYB/KYC/AML process (operation 308). System 100 may create a level 2 access account for the user to provide the user with full exchange access (operation 310), which may include all access of the level 1 access plus full access to the exchange, for example, authorizing the user to acquire and/or exchange tokens created to represent tokenized assets. Upon successful completion of the KYB/KYC/AML process, system 100 may also allocate computing resources (e.g., system memory resources, storage resources, network resources etc.) for the creation of digital wallets. Using the allocated computing resources, system 100 can create multiple digital wallets or financial holdings accounts for the user For example, system 100 can create a digital security wallet to hold digital assets (operation 312), a fiat account to hold fiat currency (operation 314), and a digital currency wallet to hold cryptocurrency tokens (operation 318). The user's digital wallet can be used to receive, transmit, hold, etc. tokens (e.g., asset tokens representing fractional interests in an asset) generated by system 100 and from/to other user digital wallets at system 100. The user's digital currency wallet may receive and/or transmit cryptocurrency tokens from/to digital currency wallets and/or accounts off system 100. The user's fiat account can be used to receive and/or transmit fiat from/to digital fiat accounts/currency wallets and/or accounts off of system 100. The user may fund the user's fiat account, for example, via an ACH transfer or ACH exchange with a bank or other financial institution (operation 316). The user may also transfer fiat currency from the user's fiat account on system 100 to a bank or other financial institution external to the system 100 via an ACH transfer (operation 316).

With reference to operation 318, the level 2 account may facilitate the user (e.g., buyer 116) to acquire and exchange tokens on system 100. When the user (e.g., buyer 116) acquires an asset token from seller 114, funds may be transferred out of the user's (e.g., buyer's) fiat account (e.g., currency custody module 156) and/or digital wallet custody module 158 to the seller's fiat account (e.g., currency custody module 150) and/or digital wallet custody module 157, respectively. In turn, the asset token may be moved from the owner's or seller's digital wallet (e.g., platform digital wallet custody module 144 and platform digital wallet custody module 152, respectively) to the user's digital token wallet (e.g., platform digital wallet custody module 162).

When the user (e.g., seller 114) transfers an asset token to buyer 116, funds may be transferred into the user's fiat account (e.g., seller 114's currency custody module 150) from the buyer's fiat account (e.g., currency custody module 156), and the asset token may be moved out of the user's token wallet (e.g., seller 114's platform digital wallet custody module 152) and into the buyer's token wallet (e.g., platform digital wallet custody module 162).

In some aspects, the user's account(s) on the system 100 may earn dividends, and the earned dividends may be moved into the user's fiat account when in the form of fiat currency or into the user's digital currency wallet when in the form of a cryptocurrency. Note that on system 100, asset tokens may be purchased by and/or sold for any or a variety different forms of fiat currency and/or cryptocurrency, or combinations thereof. Likewise, in such aspects, the dividends may be earned and paid to a user's account in a variety different forms of fiat currency and/or cryptocurrency, or combinations thereof.

Some users may purchase asset tokens using cryptocurrency, as described in detail below. Such a user may first successfully complete a wallet know-your-transaction (KYT) process, such as a security process, and address screen (operation 320) to ensure the authenticity and security of the user's existing cryptocurrency. System 100 may then connect the digital currency wallet to an external cryptocurrency digital wallet for the user (operation 322) based on determining that the authenticity and security are proper. The user may then transfer cryptocurrency from an off-platform digital wallet to the user's on-platform cryptocurrency digital wallet. In certain aspects, the security process is continually monitoring the digital currency wallet to determine proper authenticity and security.

When the user acquires an asset token on system 100 using cryptocurrency, cryptocurrency may be transferred from the user's crypto wallet to the platform crypto wallet and the asset token may be moved to the user's token wallet. When the user transfers an asset token on system 100 using cryptocurrency, cryptocurrency may be transferred into the user's crypto wallet from the platform crypto wallet and the asset token may be moved out of the user token wallet. In either case, the platform may settle the transaction with the counterparty, either in cryptocurrency or fiat currency.

Figure 4:
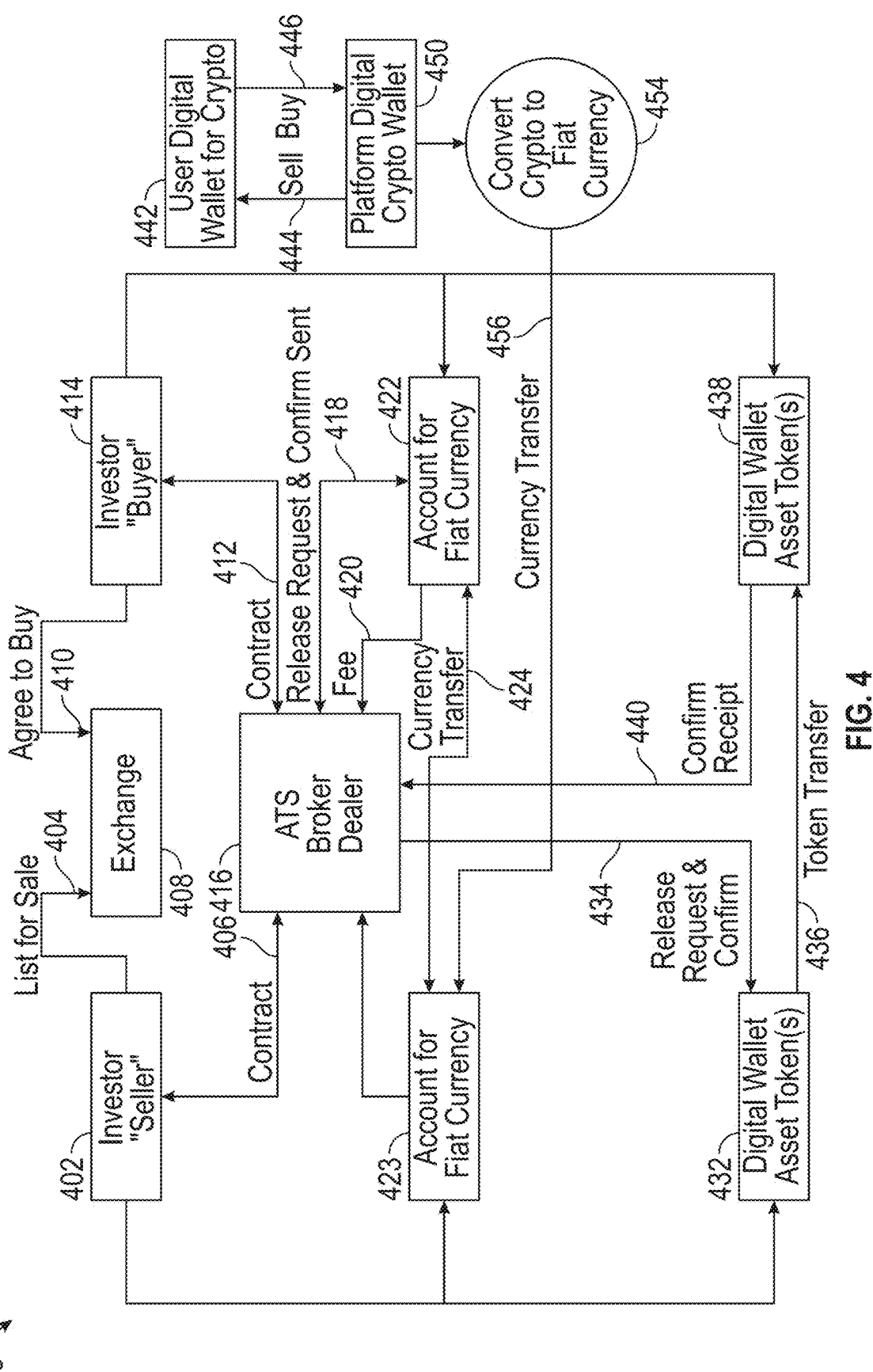
FIG. 4 illustrates an example process for acquiring and transferring asset tokens.

FIG. 4 illustrates an exemplary process 400 for acquiring and transferring asset tokens, according to some embodiments of the disclosed technology. Process 400 can be implemented using the components of system 100. A first investor (illustrated at block 402), referred to herein as the "seller," such as seller 114, holds an asset token in the seller's asset wallet (e.g., platform digital wallet custody module 152), as depicted at block 432. Seller 114 requests (404) the asset token be listed for sale on an exchange, as illustrated at block 408. In response, the system 100 informs a broker/dealer (at block 416), such as the transaction ATS broker/dealer module 130, which generates a corresponding seller smart contract, and sends that seller smart contract to the seller for acceptance (shown at 406).

A second investor (depicted at block 414), referred to herein as the "buyer," such as buyer 116, agrees (at 410) to acquire the asset token. In response, the platform informs the broker/dealer (at block 416), which generates a corresponding buyer smart contract, and sends (at 412) that buyer smart contract to the buyer (depicted at block 414) for acceptance.

The broker/dealer (at block 416) may perform a verification of funds available in the buyer's accounts, for example, to ensure that the buyer has a sufficient balance to settle the transaction. If not, system 100 may send the buyer a request to add additional currency (e.g., fiat currency, cryptocurrency, tokens, and/or other digital representations of value offered to complete the transaction) to their account(s) being used to fund the acquisition. System 100 may send a release request (at 418) to the buyer's fiat account (block 422), such as the currency custody module 156, to transfer the required amount of fiat currency from the buyer's fiat account (block 422) to the seller's fiat account (block 423), such as the currency custody module 150 via currency transfers (424).

The purchase price amount may be transferred from the buyer's fiat account to the seller's fiat account, minus a service fee (at 420) associated with the acquisition. For example, if there was a purchase of $1000 and a fee of $50, there would be a transfer of $950 from the buyer's fiat account to the seller's fiat account, and a transfer of $50 from the buyer's fiat account to the broker dealer (at block 416). A service fee may be transferred from the buyer's fiat account to the broker/dealer. On receipt of the required amount into the seller's fiat account (at block 423), the platform may inform the broker/dealer.

Various safety actions can ensure an asset token is transferred to an acquiring buyer (and not another user) during the transaction process, an asset token is appropriately delisted as for sale at system 100, and an asset token is free of tampering or interface during the transaction process. For example, at approximately the same time as (or concurrently with) the release request (at 418) sent system 100 to the buyer's fiat account (at block 422), a second release request (at 434) may be sent to the seller's asset token wallet (at block 432) to hold the asset token for the buyer. This combination of release requests may protect the buyer's currency by ensuring the buyer receives the asset token in exchange for the currency transferred to the seller of the asset token, by preventing the seller from interrupting the transfer of the asset token once the seller has accepted the terms to transfer the asset token.

On receipt of the agreed-upon payment, such as, amount of currency (e.g., fiat currency, cryptocurrency, etc.) into the seller's corresponding account, system 100 may transmit a confirmation of receipt to the seller's asset token wallet. In response to receiving the confirmation of receipt of the currency, the seller's asset token wallet (at block 432) may transfer (at 436) the asset token to the buyer's asset token wallet (at block 438), such as platform digital wallet custody module 162. Upon receipt of the asset token, the buyer's asset token wallet (at block 438) may transmit (at 440) confirmation of receipt of the asset token to the broker/dealer (at block 416), thereby completing the transaction. System 100 may update the capitalization table in the primary ledger, such as primary ledger 102 (shown in FIG. 1), to reflect the transaction, and then (possibly automatically) semi-redundantly synchronize the update to the secondary ledger, such as secondary ledger 104 (shown in FIG. 1), accordingly.

Although the acquire/transfer process has been described herein largely in terms of the exchange of fiat currency, either or both of the buyer and seller may use other digital representations of value (e.g., cryptocurrency or other digital tokens) instead of, or in addition to, fiat currency. System 100 may perform any conversions (at 454) between fiat currency, cryptocurrency, and/or other digital tokens as appropriate to facilitate and complete the transactions (444, 446) on system 100.

Figure 5:
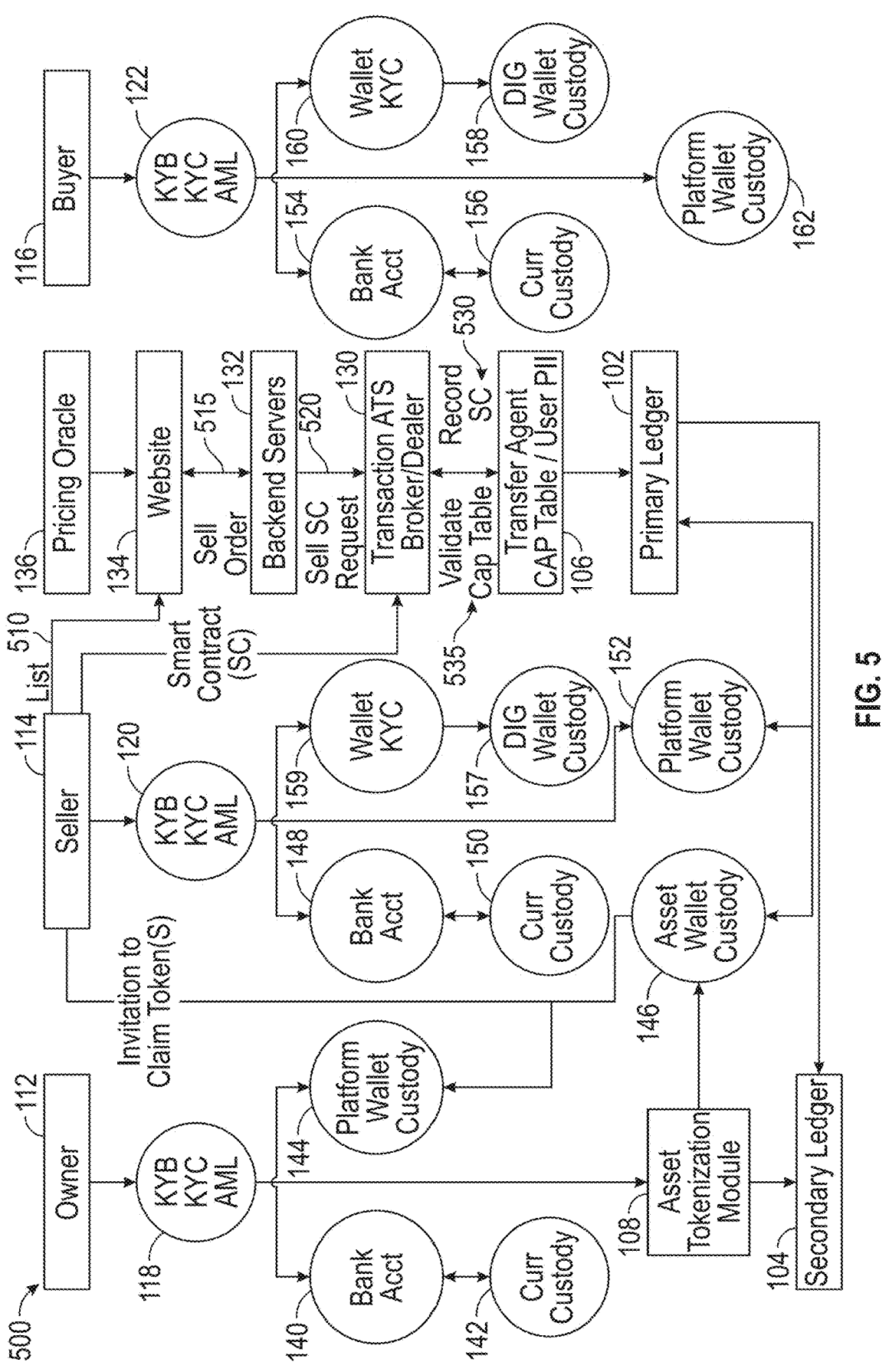
FIG. 5 illustrates an example seller login and transaction flow

FIG. 5 illustrates an exemplary seller login and transaction flow 500, according to some embodiments of the disclosed technology. Process 500 can be implemented using the components of system 100. Seller 114 may register with and log into system 100 and be authenticated as an authorized user of system 100 according to KYB KYC AML 120 protocols and methodologies. Seller 114 may link bank account 148 and currency custody module 150 to system 100. Currency custody module 150 may serve as a custodian for seller 114's fiat currency on system 100. Platform digital wallet custody module 152 may serve as a custodian for seller 114's digital assets on system 100.

Seller 114 may receive, from asset wallet custody module 146, an invitation 505 to claim digital assets generated by the asset tokenization module 108 to represent investors' shares (fractionalized interest) in an asset tokenized by asset tokenization module 108. An example of such an asset may include real property, e.g., commercial real estate. When seller 114 claims the digital assets (tokens) generated by asset tokenization module 108, asset wallet custody module

146 may transmit the digital assets (tokens) to seller 114's platform digital wallet custody module 152. For example, seller 114 can claim digital assets (tokens) in order to subsequently trade the digital assets at system 100. Concurrently, also when seller 114 claims the digital assets (tokens) generated by asset tokenization module 108, system 100 can transmit transfer information regarding the transfer (from 146 to 152) to the transfer agent 106. Transfer agent 106 can record the transfer information in primary ledger 102. The transfer information can be (e.g., automatically) semi-redundantly synchronized (e.g., with PII removed) to secondary ledger 104.

Seller 114 may then list 510 the asset and/or asset tokens on system 100 as being available for sale, purchase, exchange, investing in, transferring, or any other appropriate listing action. Seller 114 may list 510 the asset and/or asset tokens via the website 134. For example, website 134 can send user-interface data including listing 510 to a web browser at a computing device. The web browser can present a user-interface including listing 510 at display device of the computing system. Listing 510 can include a list of multiple assets and/or asset tokens that are available on system 100. The web browser can present a user-interface including listing 510 of the multiple assets and/or asset tokens at the display device.

In one aspect, the user-interface including listing 510 is presented at a web browser of a computing device of buyer 116. Using an input device at the computing device, buyer 116 can select one or more of multiple assets and/or asset tokens for purchase from the web browser user-interface. Buyer 116's selection can be propagated back to website 134.

Responsive buyer 116's selection from the web-browser user interface, website 134 and/or backend servers 132 can generate a sell order. The sell order may be an order to request creation of a smart contract (SC) 525 to facilitate a sale, purchase, exchange, investment in, transferring of, or similar type of disposition of the selected asset(s) and/or asset token(s). In response to receiving the sell order 515, backend servers 132 may generate and transmit a sell SC request 520 to transaction ATS broker/dealer module 130 to request the creation of SC 525 between transaction ATS broker/dealer module 130 and seller 114.

Transaction ATS broker/dealer module 130 may establish SC 525 with seller 114 for the contemplated transaction involving the selected asset(s) and/or asset token(s) transferred to platform digital wallet custody module 152. Transaction ATS broker/dealer module 130 may record the smart contract (operation 530) and update and/or validate the capitalization (cap) table (operation 535) via transfer agent 106. Recording the smart contract and updating and/or validating the capitalization (cap) table can be based on the SC 525 and/or the asset tokens transferred to platform digital wallet custody module 152 by asset wallet custody module 146.

Transfer agent 106 may include and/or utilize user PII of seller 114 and/or owner 112 in the update and/or validation of the cap table. Transfer agent 106 may maintain an up-to-date copy of the cap table and related user PII. Transfer agent 106 may update the cap table and/or related user PII based on input provided via website 134 and routed to transfer agent 106 via backend servers 132 and/or transaction ATS broker/dealer module 130. Transfer agent 106 records the smart contract 525 as well as entries pertaining to the contemplated and performed transactions involving the asset and/or asset tokens in primary ledger 102 and (e.g., semi-redundantly synchronized) in secondary ledger 104.

Figure 6:
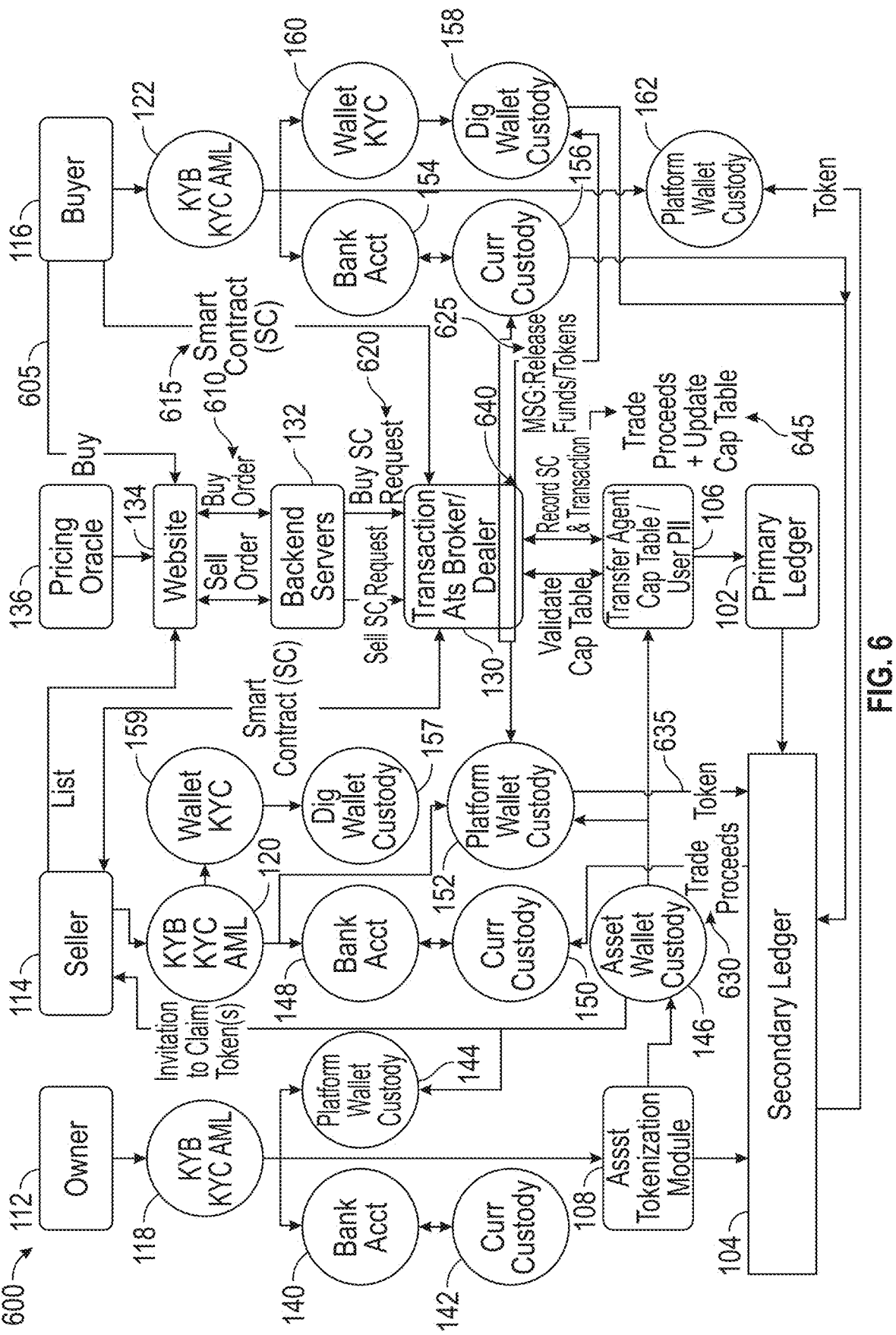
FIG. 6 illustrates an example buyer login and transaction flow.

FIG. 6 illustrates an exemplary buyer login and transaction flow 600, according to some embodiments of the disclosed technology. Process 600 can be implemented using the components of system 100. Buyer 116 may register with and log into system 100 and be authenticated as an authorized user of the system 100 according to KYB KYC AML 122 protocols and methodologies. Buyer 116 may link bank account 154 and currency custody module 156 to system 100. Currency custody module 156 may serve as a custodian for buyer 116's fiat currency on system 100.

Digital wallet custody module 158 may serve as a custodian for buyer 116's digital assets on system 100. These digital assets may include cryptocurrency, e.g., USDC tokens and/or other appropriate digital assets. Digital wallet custody module 158 may authenticate with system 100 according to wallet KYC 160 protocols and methodologies. Digital wallet custody module 158 may also include functionality and/or an interface to convert or exchange the digital currency held thereby into fiat currency for the benefit of buyer 116. Conversions or exchanges of the cryptocurrency held by digital wallet custody module 158 to fiat currency may be documented by a transaction entry in primary ledger 102 and (e.g., semi-redundantly synchronized) in secondary ledger 104.

Platform digital wallet custody module 162 may serve as a custodian for buyer 116's asset tokens acquired on system 100 by buyer 116.

As described, the user-interface including listing 510 is presented at a web browser of a computing device of buyer 116. Using an input device at the computing device, buyer 116 can select one or more of multiple assets and/or asset tokens for purchase from the web browser user-interface. Buyer 116's selection can be propagated back to website 134.

Thus, buyer 116 may view the listed asset and/or asset tokens on system 100 as being available for sale, purchase, exchange, investing in, transferring, or the like via website 134. Responsive to viewing the listing of the asset(s) and/or asset token(s) via website 134, buyer 116 may make an offer to buy 605 the listed asset(s) and/or asset token(s) via website 134. Responsive to buyer 116's offer to buy 605 the listed asset(s) and/or asset token(s), a buy order 610 may be generated by website 134 and/or backend servers 132 (which may host or control at least some aspects of the website 134).

Buy order 610 may be an order to request creation of a create smart contract (SC) 615 to facilitate a sale, purchase, exchange, investment in, transferring of, or similar type of disposition of the asset(s) and/or asset token(s). In response to receiving buy order 610, backend servers 132 may generate and transmit buy SC request 620 the transaction ATS broker/dealer module 130. Buy SC request 620 requests the creation of the SC 615 between transaction ATS broker/dealer module 130 and buyer 116. Transaction ATS broker/dealer module 130 may establish SC 615 with buyer 116 for the contemplated transaction involving the asset(s) and/or asset token(s) transferred to the platform digital wallet custody module 152.

Transaction ATS broker/dealer module 130 may perform on the SC 615 by: (1) transmitting electronic message(s) instructing digital wallet custody module 158 and currency custody module 156 to release buyer 116's funds and/or tokens to be exchanged for seller 114's asset tokens and (2) transmitting electronic message(s) instructing platform digital wallet custody module 152 to release seller 114's asset tokens to be exchanged for buyer 116's funds and/or tokens (operation 625).

Responsive to receiving the message from transaction ATS broker/dealer module 130, seller 114's platform digital wallet custody module 152 may transmit the asset token(s) to buyer 116's platform digital wallet custody module 162 and/or currency custody module 156 may transmit trade proceeds 630 being exchanged for the asset token(s) to seller 114's currency custody module 150 per the terms of the smart contract 615. Trade proceeds 630 may include cryptocurrency, cryptocurrency converted to fiat currency, and/or fiat currency. In some aspects, digital wallet custody module 158 may include or interface with a module configured to convert cryptocurrency (e.g., USDC), which may be held by digital wallet custody module 158, into fiat currency acceptable by the seller 114's currency custody module 150.

Digital wallet custody module 158 can, alternatively or additionally, transmit trade proceeds 630 being exchanged for the asset token(s) that are held in crypto to seller 114's digital wallet custody module 157. A blockchain may create and store a blockchain entry corresponding to the transfer of trade proceeds 630 from buyer 116's currency custody module 156 and/or digital wallet custody module 158 to seller 114's currency custody module 150 and/or digital wallet custody module 157, respectively.

In some aspects, seller 114 may also have, included within or coupled with system 100, digital wallet custody module 157 to receive and hold digital assets such as cryptocurrency in addition to or in place of fiat currency in exchange for asset tokens. In such aspects, buyer 116's digital wallet custody module 158 may not convert cryptocurrency funds into fiat currency when transmitting trade proceeds 630 to seller 114's digital wallet custody module 157.

In other aspects, seller 114's digital wallet custody module 157 can similarly include or interface with a module configured to convert cryptocurrency (e.g., USDC), which may be held by digital wallet custody module 157, into fiat currency acceptable by buyer 116's currency custody module 156. Responsive to receiving the message from transaction ATS broker/dealer module 130, seller 114's platform digital wallet custody module 152 may transmit asset token(s) 635 to buyer 116's platform digital wallet custody module 162 per the terms of the smart contract 615. The blockchain may create and store a blockchain entry corresponding to the transfer of the asset token(s) 635.

Transaction ATS broker/dealer module 130 may record the smart contract and transaction (operation 640) and update and/or validate the capitalization (cap) table (operation 645) via the transfer agent 106, for example, based on the SC 615, trade proceeds transferred to seller 114's currency custody module 150 and/or digital wallet custody module (not shown), and/or the asset tokens 635 transferred to buyer 116's platform digital wallet custody module 162 by seller 114's platform digital wallet custody module 152. Transfer agent 106 may include and/or utilize user PII of buyer 116, seller 114, and/or owner 112 in the update and/or validation of the cap table. Transfer agent 106 may maintain an up-to-date copy of the cap table and related user PII. Transfer agent 106 may update the cap table and/or related user PII based on input provided via the website 134 and routed to transfer agent 106 via backend servers 132 and/or transaction ATS broker/dealer module 130. Transfer agent 106 may also record entries pertaining to the contemplated and performed transactions involving the asset(s) and/or asset tokens in the primary ledger 102 and (semi-redundantly synchronized) in secondary ledger 104.

Figure 7:
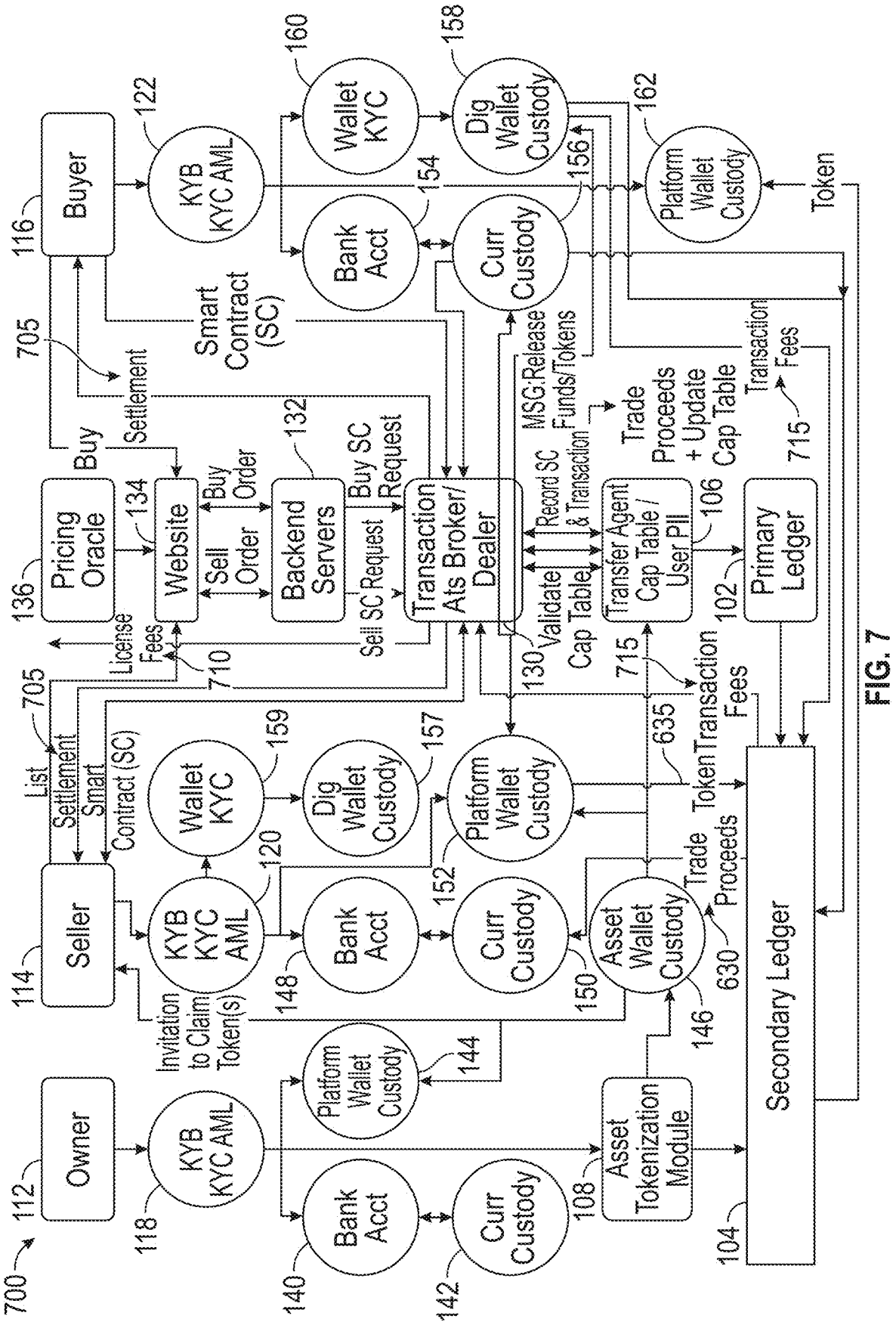
FIG. 7 illustrates an example fee flow.

FIG. 7 illustrates an exemplary fee flow 700, according to some embodiments of the disclosed technology. Process 700 can be implemented using the components of system 100. As the trade proceeds are being transferred on system 100 as described with respect to FIGS. 5-6, transaction ATS broker/dealer module 130 transmits requests to buyer 116's currency custody module 156 and/or digital wallet custody module 158 and to seller 114's currency custody module 150 and/or digital wallet custody module 157 to collect transaction fees 715 for distribution. Transactions fees 715 can include, but are not limited to, licensing fees 710 distributed to transaction ATS broker/dealer module 130, partnership fees distributed to transfer agent 106, and other appropriate fees.

Transaction ATS broker/dealer module 130 may receive transaction fees 715 associated with the transaction completed (settled) on system 100 from the buyer 116's currency custody module 156 and/or digital wallet custody module 158 and seller 114's currency custody module 150 and/or digital wallet custody module 157. Transaction fees 715 may be payable and funded via fiat currency and/or cryptocurrency, for example, as described above. In some examples, transaction fees 715 may be payable and funded by other digital assets, for example, NFTs.

Moreover, transaction ATS broker/dealer module 130 transmits settlement statements 705 to seller 114 and/or buyer 116. The transfer of transaction fees 715 may be recorded on the primary ledger 102 and (semi-redundantly synchronized) on the secondary ledger 104. As depicted in FIG. 7, transaction fees 715 are payable by and transferred to the transaction ATS broker/dealer 130. However, this is merely an example, and in other examples, transaction fees 715 may be payable by and transferred to transaction ATS broker/dealer module 130 by any combination of owner 112, seller 114, buyer 116, and/or third parties outside system 100, and/or their associated currency custody modules, digital custody modules, platform wallet custody modules, asset wallet custody modules, and/or the like.

Transaction ATS broker/dealer module 130 may distribute license fees 710 associated with the transaction completed (settled) on system 100 to those owed the license fees 710, such as, transaction ATS broker/dealer module 130. Examples of license fees may include royalties, service fees, intellectual property license fees, and software license fees for software, systems, and methods used by system 100 to complete (settle) the transactions. License fees 710 may be funded from the transaction fees 715 received by transaction ATS broker/dealer module 130.

The described systems, methods, and technologies provide numerous advantages over conventional systems. For example, system 100 may provide owners and sellers with the ability to exit a commercial real estate investment (as an asset) much earlier than the typical hold period for such asset types. In many commercial real estate investments, investors may hold the asset for five to seven (5 to 7) years for various reasons associated with processes and procedures for transferring ownership of the asset as a whole. At the end of the hold period (which may be mandated by statute, regulation, or other law, for example, SEC Rule 144), the owner of an investment property (e.g., commercial real estate) may either transfer the property or refinance the property. Refinancing the property may provide a liquidity event to the investor.

A technological system and method for fractionalizing and tokenizing such assets as described herein may provide owners of assets that would otherwise be subject to extended hold periods the ability to participate in liquidity opportunities and/or offer liquidity opportunities to their investors on a shorter timeline than with conventional legal processes, which may by and large be manually executed with extended delays. The technologies disclosed herein facilitate sellers in trading asset tokens and monetizing their investments in underlying assets, thereby unlocking an ability to re-invest capital and supporting the cycle of investment. For example, liquidity provided by the disclosed technology of system 100, even after just one year, may help create at least five to seven (5-7) times the liquidity in the entire ecosphere compared to traditional approaches. As an example, compared to traditional approaches in which a share of a real estate investment property is held for five (5) years, the technology disclosed herein may facilitate the asset tokens being traded five (5), ten (10), one hundred (100), or more times, for example, within the same five years.

Figure 8:
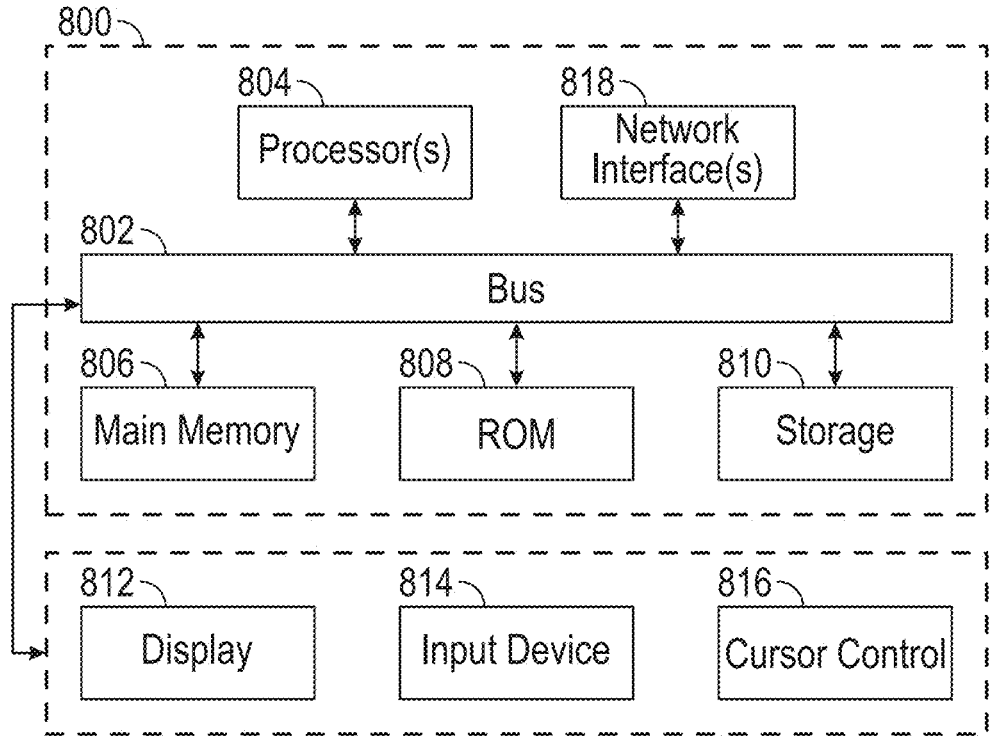
FIG. 8 illustrates a block diagram of an example computer system.

FIG. 8 depicts a block diagram of an example computer system 800 in which embodiments described herein may be implemented. System 100, system 1200, computer architecture 1300, etc. can be implemented using components of and computing resources depicted in computer system 800. Computer system 800 may include bus 802 or other electronic communication mechanism for communicating information, and one or more hardware processors 804 coupled with bus 802 for processing information. Hardware processor(s) 804 may include, for example, one or more general purpose microprocessors and/or application specific integrated circuits (ASICs) configured to perform the processes and methods described herein and related processes and methods.

Computer system 800 also may include main (system) memory 806, for example, a random-access memory (RAM), cache, and/or other dynamic storage devices, coupled to bus 802 for storing information and instructions to be executed by processor(s) 804. Main memory 806 can also be used for storing temporary variables or other intermediate information during execution of instructions by processor(s) 804. Such instructions, when stored in storage media accessible to processor(s) 804, may render computer system 800 into a special-purpose machine that is customized to perform the operations specified in the instructions.

Computer system 800 may further include a read only memory (ROM) 808 and/or other static storage device coupled to bus 802 for storing static information and instructions for processor(s) 804. Storage device 810, for example, a magnetic disk, optical disk, and/or USB thumb drive (Flash drive), etc., may be provided and coupled to bus 802 for storing information and instructions.

Computer system 800 may be coupled via bus 802 to display 812, for example, a liquid crystal display (LCD), light emitting diode (LED) display, touch screen, and/or other electronic display for displaying information to a computer user. One or more input device(s) 814, including alphanumeric and/or other keys, may be coupled to bus 802 for communicating information and command selections to processor(s) 804. Another type of user input device may include cursor control 816, for example, a mouse, a trackball, a touchpad, and/or a set of cursor direction keys for communicating direction information and command selections to processor(s) 804 and for controlling cursor movement on display 812. In some examples, direction information and command selections (e.g., selecting assets and/or tokens from a listing) may be provided by cursor control may also or alternatively be implemented via receiving touches on a touch screen without the use of a separate cursor control device.

Computing system 800 may include a user interface module to implement a graphical user interface (GUI) that may be stored in a mass storage device as executable software codes that are executed by the computing device(s).

This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the words "component," "engine," "system," "database," "data store," and the like, as used herein, may refer to logic embodied in hardware or firmware, or to a collection of software instructions, possibly having entry and exit points, written in a programming language, such as, for example, Java, C, or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, and/or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 800 may implement the techniques described herein using customized hard-wired logic, one or more ASICs or FPGAs, firmware and/or program logic which in combination with computer system 800 causes or programs computer system 800 to be a special-purpose machine. According to one embodiment, the techniques herein are performed by computer system 800 in response to processor(s) 804 executing one or more sequences of one or more instructions contained in main (system) memory 806. Such instructions may be read into main (system) memory 806 from another storage medium, such as storage device 810. Execution of the sequences of instructions contained in main (system) memory 806 may cause the processor(s) 804 to perform the methods and/or operations described herein. In alternative embodiments, hard-wired circuitry may be used in place of or in combination with software instructions.

The term "non-transitory media," and similar terms, as used herein refers to any non-transitory media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main (system) memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media may also take the form of acoustic or light waves, such as those generated during radio-wave and infra-red data communications.

Computer system 800 may also include one or more communication network interface(s) 818 coupled to bus 802. Network interface(s) 818 may provide two-way data communication coupling to one or more network links that are connected to one or more local networks. For example, network interface(s) 818 may include an integrated services digital network (ISDN) card, cable modem, satellite modem, or a modem to provide a data communication connection to a corresponding type of telephone line. As another example, network interface(s) 818 may include a local area network (LAN) card to provide a data communication connection to a compatible LAN (and/or a wide area network (WAN) component to communicate with a WAN). Wireless links may also be implemented. In any such implementation, network interface(s) 818 send and receive electrical, electromagnetic, and/or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn may provide data communication services through the worldwide packet data communication network now commonly referred to as the "Internet." Local network and Internet both use electrical, electromagnetic, electronic, and/or optical signals that carry digital data streams. The signals through the various networks and the signals on network link and through network interface(s) 818, which may carry the digital data to and from computer system 800, are example forms of transmission media.

Computer system 800 may send and receive electronic messages and data, including program code, through the network(s), network link and network interface(s) 818. In the Internet example, a server might transmit a requested code for an application program through the Internet, the ISP, the local network, and network interface(s) 818.

The received code may be executed by the processor(s) 804 as it is received, and/or stored in the storage 810, or other non-volatile storage for later execution.

The methods, systems, and technologies can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

System 100, system 1200, computer architecture 1300, etc. can be implemented in a cloud computing environment and/or using a cloud computing model.

An example initial use case for the disclosed technology is for use within a financial exchange that includes a secondary market for digital shares of real assets, such as, an Alternative Trading System (ATS).

In some aspects, an exchange administrator configures a financial exchange (e.g., system 100) to pause and/or kill (stop) one or more transactions on the financial exchange. The exchange administrator can also configure the financial exchange to subject paused transitions to (human and/or automated) additional review. Pausing or killing one or more transactions can be based at least partially on compliance/non-compliance with one or more "outside" (or "external") factors and/or one or more "inside" factors. An "outside" factor can include data, an event, or a situation that occurs outside a financial exchange (e.g., outside an ATS). An "inside" factor includes data, an event, or a situation specific and/or internal to the financial exchange (e.g., inside the ATS) An exchange administrator and/or a financial exchange can pause and/or kill (stop) one or more transactions responsive to detecting non-compliance with one or more factors (e.g., one or more outside factors and/or one or more inside factors).

Checking compliance/non-compliance with one or more factors can include performing various processing activities, such as, for example, calculating data values, comparing data values, scanning trades, monitoring user behavior, monitoring price movements, monitoring price volatility, monitoring price spikes, monitoring computer/network resources (e.g., software, hardware, firmware, etc.), etc. For example, a financial exchange (e.g., system 100) can include one or more risk management systems. The one or more risk management systems can continually run in background (for example, scanning trades, monitoring user behavior, and watching for volatile and unexplained price movements). In general, the one or more risk management systems can collect, check, monitor: outside factors, inside factors, data related to outside factors, data related to inside factors as well as any combinations thereof. Data related to a factor (outside or inside) includes any data that indicates compliance/non-compliance with the factor and/or can be further processed to detect/check compliance/non-compliance with the factor. Data related to a factor can include transaction data. Collected, checked, or monitored factors and/or data can be processed or compared to determine compliance/non-compliance with another factor. Factors can be dependent or otherwise interrelated such that one factor (either outside or inside) is data used to determine compliance/non-compliance with another factor (either outside or inside) or a plurality of factors (e.g., one or more outside and/or one or more inside) form a combination factor.

In some aspects, an inside factor includes a maximum ownership factor defining a maximum fractional interest in an asset that an individual/entity is permitted to own. An ATS can include a plurality of maximum ownership factors with each maximum ownership factor corresponding to a different asset and/or different individual/entity or combination thereof. A maximum ownership factor may apply generally to all users of the ATS, to a sub-group of users at the ATS, or to individual users at the ATS. Likewise, a maximum ownership factor may apply generally to all assets of the ATS, to a sub-group of assets at the ATS, or to individual assets at the ATS. Maximum ownership factors can vary between assets and/or individuals and entities as well as combinations thereof. For example, an individual may be permitted to own up to 20% of one asset and up to 30% of another asset. As another example, one user may be permitted to own 10% of an asset and another user may be permitted to own 20% of the asset.

Detected non-compliance with a maximum ownership factor can be flagged for heightened/additional review and/or suspension via the throttle (pause/unpause) or kill switch components of a Settlement Approval (SAS) system. As such, the throttle (pause/unpause) and/or kill switch components facilitate increased scrutiny of attempts to obtain larger percentages of an asset.

Inside factors can also include problematic trading pattern factors and problematic user factors. Problematic trading pattern factors can define trading patterns more likely indicative of fraudulent, nefarious, or otherwise inappropriate trading activities. Problematic user factors can define user behavior more likely to be fraudulent, nefarious, or otherwise inappropriate. In some aspects, problematic trading pattern factors and/or problematic user factors can at least partially overlap. Problematic trading pattern factors and/or problematic user factors can include: trading where recent prices are significantly different from the valuation of the underlying asset, a person putting in multiple orders that indicate AML violations in the combination of their frequency, timing, and aggregate value, a user who has previously charged back funds (e.g., attempted to avoid payment for shares) is attempting to place a large number or value in buy orders by using new money recently wired to the user's account, or repeated and/or simultaneous trades attempting to subvert a maximum ownership factor for an asset.

Detected non-compliance with a problematic trading pattern factor and/or problematic user factor can be flagged for heightened/additional review and/or suspension via the throttle (pause/unpause) or kill switch components of a Settlement Approval (SAS) system. As such, the throttle (pause/unpause) and/or kill switch components provide increased scrutiny of potentially fraudulent or other nefarious trading activities. The throttle or kill switch components (or a human after additional review) can also notify a user's financial institution of a detected problem. The financial institution may place a hold or freeze on a user's (e.g., a buyer's or a seller's) account (at least for the duration of a further review or until a trade is unpaused or killed).

Inside factors may also include ATS error factors, such as, a service for asset pricing being unavailable or unresponsive, or buyer's wallet address is unreachable or invalidated, buyer and/or seller has not completed confirmation, one party revoked authorization after the transaction was initiated, a required co-signature or multi-party approval was not completed, discrepancy in asset metadata or ownership documentation, change in legal jurisdiction or restrictions affecting asset transfer, time-bound offer expired before settlement was completed, asset became non-transferable (e.g., due to delisting, or other outside factors), discrepancy in settlement instructions (e.g., routing information mismatch).

Detected non-compliance with an ATS error factor can be flagged for heightened/additional review and/or suspension via the throttle (pause/unpause) or kill switch components of a Settlement Approval (SAS) system. As such, the throttle (pause/unpause) and/or kill switch components facilitate increased scrutiny of transactions associated with ATS errors.

Inside factors may also include verification factors, such as, ATS internal processes, regulatory compliance, user experience, identity verification pending or failed for either party, regulatory KYC/AML compliance check failure, smart contract validation failed during settlement, failed to meet ATS minimum settlement degree of excellence benchmark, etc.

A minimum settlement degree of excellence benchmark factor helps ensure there is a high standard for settling transactions on the ATS (and can include other subfactors). A minimum settlement degree of excellence benchmark factor can apply to (1) internal processes, (2) regulatory compliance, and (3) user experience. In some aspects, a minimum settlement degree of excellence benchmark is measured across all three domains. Minimum settlement degree of excellence benchmark factor subfactors can include, but are not limited to: irregularity with the user account, irregularity with the system, irregularity with the infrastructure. Generally, an ATS includes multiple integrated services working together. As such, other minimum settlement degree of excellence benchmark factor subfactors can relate to inter-service communication or latency issues.

Detected non-compliance with a minimum settlement degree of excellence benchmark factor can be flagged for heightened/additional review and/or suspension via the throttle (pause/unpause) or kill switch components of a Settlement Approval (SAS) system. As such, the throttle (pause/unpause) and/or kill switch components facilitate increased scrutiny of transactions potentially not achieving a minimum settlement degree of excellence benchmark (reduced customer experience, platform instability, regulatory risk non-compliance).

As described, factors can be dependent or otherwise interrelated such that one factor (either outside or inside) is data used to determine compliance/non-compliance with another factor (either outside or inside) or a plurality of factors (e.g., one or more outside and/or one or more inside) form a combination factor. As such, one or more inside factors may be dependent on one or more outside factors. In aspects, outside factors like a macro event factor may also affect the minimum settlement degree of excellence benchmark factor. For example, a sufficiently large shift in the treasury rate or an exchange rate (either fiat or crypto), can create a poor uninformed experience because of the uncertainty. The Settlement Approval (SAS) system may stop the transaction out of abundance of caution and deference to the customer experience, platform stability and sanctity, and regulatory risk/compliance. In another example, legal jurisdiction may be tracked for each transaction. Due to different regulatory and potentially changing political climate associated with the legal jurisdiction, a fractionalized share of a particular asset class may be impacted by pending legislation or an executive order. In this other example, a transaction may be halted out of an abundance of caution, due to a compliance requirement, or due to state-level regulations corresponding to the state(s) in which the transaction is taking place.

Additional inside factors may include mid settlement consideration factors. There may be multiple terms of trade updated during the settlement process and before closing, that cause a re-evaluation by the ATS. One such mid settlement consideration factor may be the adjustment of the settlement date. Adjustment of the settlement date mid-process can be due to operational issues, holidays, or mutual agreement between parties. For example, if a trade is executed on a Friday, the settlement might shift to Tuesday if Monday is a holiday. Delays in delivering securities or funds, system errors, or unforeseen events (e.g., market closures) may necessitate an extension.

However, extending the settlement date may increase counterparty risk (e.g., the chance a party defaults) and may affect liquidity, as funds or securities are tied up longer. Extending the settlement date could also impact dividend eligibility if the settlement misses the record date. Another mid settlement consideration factor may be the modification of payment terms. During the settlement, parties may agree to adjust payment frequency allowing partial payments, or using a different funding source (e.g., margin loans instead of cash). Adjusting payment terms can prevent trade failures but may incur additional costs, such as interest on margin, or penalties if the ATS must cover the trade. For transactions regarding funds or derivatives, mid settlement changes might involve adjusting collateral requirements. Mismatches in settlement cycles between funds and their underlying assets can force participants to post collateral earlier. The increased collateral demands reduce liquidity for participants and could affect market liquidity and pricing.

In some aspects, a mid settlement consideration factor includes and/or is dependent on timing or volatility issue factors. One example of timing or volatility issue factors are timing or volatility associated with cryptocurrencies are known to have rapid and significant price fluctuations. Generally, a cryptocurrency is any form of currency that primarily, if not exclusively, exists digitally, uses a decentralized network/system (e.g., distributed ledgers) to record transactions and manage the issuance of new units, and relies on cryptography to prevent counterfeiting and fraudulent transactions. Most cryptocurrencies experience increased volatility relative to fiat currencies, commodities, and other types of assets based on market sentiment and other factors.

Some cryptocurrencies, often referred to as "stablecoins", are pegged to an external asset, such as, a fiat currency or a commodity. Stablecoins can maintain a more consistent value, for example, by being pegged 1:1 to a fiat currency. As such, stablecoins are designed to minimize price swings relative to other non-stablecoin cryptocurrencies (hereinafter referred to as "crypto"). Stablecoins can achieve stability by holding reserves of the asset they are pegged to, such as, U.S. dollars, or by using algorithmic mechanisms to adjust supply based on market demand.

When transacting, different people may prefer different types of currencies based on characteristics of the different currencies. Some may prefer fiat currency due to the relative stability and central management by governmental entities. Others may prefer stablecoin due to the relative stability and decentralized management. Still others may prefer crypto due to volatility and decentralized management. However, there may be the scenario when the user preferred cryptocurrency has deviated beyond an acceptable volatility threshold between transaction initiation and transaction settlement.

Another example of timing and volatility issue factors may include blockchain congestion or industry specific volatility. A blockchain may have a limited capacity to process transactions, determined by factors like block size, block time, and network throughput. High transaction volume, or complex smart contract executions may result in pending transactions that exceed the network's ability to include them in blocks promptly. Because of this delay, a transaction may no longer be economically viable due to increased risk costs (e.g., carrying costs, cryptocurrency fluctuations, etc.). For a transaction associated with a blockchain smart contract that is internally managed by the ATS, timing and volatility issue factors related to congestion, processing latency, and the cost of execution can be considered (and may be reasons for halting or blocking a transaction).

Timing or volatility issue factors can also include smart contract factors. Smart contract execution may refer to a function in a smart contract that runs on the blockchain involving (potentially intricate) logic, multiple interdependent functions, interactions with other contracts or external systems, and/or significant computation resources. An example smart contract in the ATS may be running on Ethereium Virtual Machine (EVM), which requires and performs functions needed to settle the transaction. Further, smart contracts on the ATS may include registering a new owner of a fractional interest on the blockchain or changing the status of an existing owner's shares. Outside factors may also contribute to the triggering of the SAS in this scenario, such as an external blockchain component, which could be cryptocurrency. It might be the case that the fractional interest a party owns requires a transfer to be tradable on the platform. The availability of that fractional interest is inhibited by an external network or cost factors.

Similarly, a further example of timing and volatility issue factors may include network timeout or communication errors between clearing systems. For example, a gas fee spike may cause transaction to be economically unviable. In the case of a blockchain-based transaction, the settling of a transaction often requires many independent parties to participate in the validation process. Depending on the conditions of the blockchain network at the time of transaction, the settlement can happen in nearly an instant, or it can take minutes or hours, depending on the level of congestion, priority pricing, and gas pricing. In this particular example regarding a spike in the gas fee, the gas fee refers to the cost of processing that transaction. At the time a transaction is submitted, the maximum gas fee is specified. If the transaction cannot be executed at that gas fee, it will stay in the queue behind those parties willing to pay the current market gas fee and could remain there for a period of time indefinitely. The ATS may configure a time limit within which a transaction must settle. If the gas fee spike results in the transaction exceeding the time limit the transaction can be blocked.

Detected non-compliance with a mid settlement consideration factor can be flagged for heightened/additional review and/or suspension via the throttle (pause/unpause) or kill switch components of a Settlement Approval (SAS) system. As such, the throttle (pause/unpause) and/or kill switch components facilitate increased scrutiny of transactions having terms outside that of an original agreement, disadvantage a party to transaction, etc. due to changes occurring between transaction initiation and transaction settlement.

Outside factors might include a major regional, national, or global event factor or incident factor that unfolds in regional, national, and/or global news. Many of these events or incidents are likely initially "ambiguous" in terms of understanding impact to human lives, the economy, and even asset value. In these instances, the exchange administrator might want to slow or pause trades in response to the unfolding situation and potential disturbances or government responses. One example event is a terrorist attack, wherein the perpetrator and/or the extent of casualties are unknown. Another example event is a mass shooting unfolding on live news. Another example is a cyber attack on a third party server provided by Amazon, Google, or a financial institute, such as JP Morgan Chase's Online Banking services.

Detected non-compliance with a major regional, national, or global event factor or incident factor could be flagged for heightened review and/or suspension via the throttle (pause/unpause) and/or kill switch components of a Settlement Approval Service (SAS) system. As such, the throttle (pause/unpause) and/or kill switch components provide increased scrutiny of transactions associated with increased ambiguity or uncertainty due to regional, national, or global events or incidents.

Another example of an outside factor includes a government regulation factor that effects an asset value. The Government is able to release news and decisions on its own timeline. Some decisions are clearly announced, and any user of the exchange would be equally warned or "on notice" that new information is coming (e.g., the Federal Reserve's decision on interest rate changes). However, other releases, such as a Supreme Court decision or previous Presidential announcements, are not always foreshadowed. There are several instances where meaningful Government action is taken that potentially affects the assets on the exchange and/or the exchange itself. In these instances, the exchange administrator might want to slow or pause trades, and take time to ensure the implications of any updated regulation are accurately understood before allowing trades to proceed. One example is an announcement by the SEC regarding the classification and governance of various cryptocurrencies. Another example is a blanket announcement regarding changes in real estate laws that allow large proportions of old office buildings to be approved for multi-family apartment buildings on a broad basis.

Detected non-compliance with a government regulation factor could be flagged for heightened review and/or suspension via the throttle (pause/unpause) and/or kill switch components of a Settlement Approval Service (SAS) system. As such, the throttle (pause/unpause) and/or kill switch components provide increased scrutiny of transactions when the impact of a new government information is not yet fully understood.

Another example of an outside factor is retail customer protection factor. A requirement for a regulated retail exchange in the United States is to provide some baseline of protection for a retail investor. One way to protect retail investors is to ensure that all users of the exchange generally have equal access to information that could meaningfully impact the user's decision to trade an asset and at what price to sell or buy the asset. The exchange administrator might want to slow or pause trading if there is a potential information imbalance between owners, sellers, and buyers.

One example is an earthquake in Los Angeles, where the extent of damage to commercial real estate assets listed on the exchange is initially unknown (but the owner is able to ascertain the extent of damage to the property more quickly than someone who bought shares in the property and lives in New Jersey, for example). Another example is if the owner of an asset (for example, the owner of a multi-family apartment building) informs the exchange administrator that the owner is party to a significant lawsuit, or the property itself has entered into a restructuring agreement or a conservatorship. The exchange administrator might need to circulate that information to market participants before trading could resume in shares of the property (or any of the owner's assets).

Detected non-compliance with a retail customer protection factor could be flagged for heightened review and/or suspension via the throttle (pause/unpause) and/or kill switch components of a Settlement Approval Service (SAS) system. As such, the throttle (pause/unpause) and/or kill switch components provide increased scrutiny of transactions when new information about an asset has yet to be fully disseminated.

Compliance with FINRA, SEC, and other government regulations/conditions/flags may be required at system 100 for transactions to be initiated, proceed through various stages, and settle. FINRA, SEC, and other government regulations/conditions/flags may be considered inside and/or outside depending on the configuration of system 100, system 1200, computer architecture 1300, etc.

Factors can also include pecuniary resources factors (factors relating to money). Pecuniary resources factors can include a combination of inside and outside factors, such as: insufficient funds on either, or both of the buyer's side or seller's side digital wallets (inside), buyer's bank imposing a transaction limit exceeded by the deal (outside), dispute or chargeback request is raised during the escrow period (outside), other holds (outside), etc.

Pecuniary resources factors may also include an additional outside factor such as the availability of funds from the purchaser's financial institution. The financial institution may have previously granted conditional approval for the transaction. However, at the time of execution, the financial institution may decline the transaction because the net total exceeds a limit they would approve. This limit could be due to the overall size of the transaction or a specific condition in the account. For example, the funding source for the transaction may be margin loans. There may be a scenario where a margin account experiences a shortfall in the required equity due to market fluctuations or other reasons, which triggers a margin call from the brokerage. Under FINRA rules, a minimum margin requirement is 25% of the account's equity for maintenance margin. The investor may need to deposit additional funds or securities to meet the minimum equity requirement, or the brokerage may liquidate holdings to cover the shortfall. In these aspects, the buyer's digital wallet lacks appropriate funds to complete the transaction due to the margin release failure.

Detected non-compliance with pecuniary resources factors could be flagged for heightened review and/or suspension via the throttle (pause/unpause) and/or kill switch components of a Settlement Approval Service (SAS) system. As such, the throttle (pause/unpause) and/or kill switch components provide increased scrutiny of trades potentially associated with insufficient pecuniary resources.

In example embodiments, a throttle (pause/unpause) component and a kill switch component of the SAS system interact and function together or independently. Broadly speaking, there may be instances where the exchange administrator needs to be able to immediately stop activity. In other instances, the exchange administrator may want to have a chance to review problematic or suspicious activity before raising a more formal alarm. The SAS system allows for this interplay between "slowing" (pausing/unpausing) and "stopping" or "terminating" (killing) a transaction, a group of transactions, or even the entire ATS. The throttle component may be used in advance of employing the kill switch component. The throttle component can be used on its own, and then resolved without escalating to the kill switch component. The kill switch component can be used immediately (without first imposing the throttle component).

There are timing considerations for use of the throttle (pause/unpause) and kill switch components of the SAS system during trade flow. A transaction is considered "live" on the exchange until the funds have been transferred from the buyer to the seller and the shares have been simultaneously transferred to the buyer from the seller. At this point, the transaction is considered "Settled." Any order could be subject to the SAS system until it reaches the "Settled" status. The SAS system is able to pause/unpause (via the throttle component) and/or kill (via the kill switch component) an order in any other status (e.g., an open sell order, a buyer attempting to lift a sale offer, or a buy limit order).

The throttle component of the SAS system does not stop a trade from moving through transaction stages (e.g., shares (e.g., tokens) are listed for sale by the seller, the buyer selects the shares (e.g., tokens) for purchase, confirmation of the seller's shares (e.g., tokens) and buyer's funds (e.g., fiat currency) by the exchange, each trade counterparty signs relevant sale/purchase consent contracts, and a settlement). Instead, the throttle component of the SAS system slows the progress of the trade through each stage. For example, each transaction stage of a trade may be subject to manual review and approval before allowing progression to the next transaction stage.

The kill switch component of the SAS system is more drastic, and immediately halts the relevant trade(s). Deploying the kill switch blocks the trade(s) from settling until, and only if, the kill switch is lifted.

Fundamentally, the SAS system is a system or a "microservice" that exists outside of the exchange ecosystem (e.g., outside an ATS). The SAS system is designed to be able to integrate with, and talk to (e.g., communicate with), each of the exchange ecosystem components and coordinate between them as needed. Each of the ATS, the broker dealer, and the transfer agent may check with the SAS before proceeding with the respective portions or aspects of a trade. For example, if a buyer selects or clicks "Buy" on a share (e.g., token) that is currently listed for sale, the ATS determines whether there is a flag on the user before moving forward with the next stages of the trade.

In example embodiments, the SAS system applies to different scenarios: a single transaction, a group of transactions, or all transactions on the exchange. The SAS system can also be based on multiple different characteristics including, without limitation, one or more specified transaction stages, a user (e.g., a specific user is flagged for manual review of the user's transactions), a group of users, an asset type (e.g., a specific commercial real estate property and the shares related to that property), a group of asset types, or a random selection where the system pulls one or more random trades for review.

In aspects, the SAS system can transition between active (on) and not active (off). The SAS system can be transitioned automatically by components in and/or connected to system 100 (e.g., trade monitoring service 902). The SAS system can also be transitioned by human users. The default may be to have the SAS system active. As such, the SAS system can check transactions and stages there or on an ongoing basis.

When the SAS system is active, transactions and stages thereof can be checked for possible association with "outside" (external) flags and/or "inside" flags. Transactions and stages thereof can be checked automatically by components in and/or connected to system 100 (e.g., trade monitoring service 902). Transactions and stages thereof can also be checked by human users. In one aspect, other components in and/or connected to system 100 consider the results of automated checks by the SAS system to be authoritative. In other aspects, results of automated checks by the SAS system are reviewed by human users. The human users can verify or override results of automated checks by the SAS system.

In example embodiments, SAS system cannot be both activated and results checked for a transaction by a single person. Rather, the SAS system is activated and approved via a "dual key" mechanism. A first person ("Screener") initiates the SAS system, which generates a key. The screener successfully responds to the key and, therefore, kill switch component (trade monitoring service 902) of the SAS system knows the initiation is legitimate. The kill switch component of the SAS system then transmits a notification to a second person ("Approver"). The approver receives details of one or more transactions in question. The approver reviews and then choses whether not to kill any of the one or more transactions.

In example embodiments, the SAS system is designed so that there are different sub-groups of people who could participate in review: a sub-group of people from the ATS (exchange) a sub-group of people in the transfer agent, and a sub-group of people in the broker dealer. A key component of the SAS system is an algorithm that is designed to constantly change the mapping between the two people who respond to the SAS system flag (e.g., the screener and the approver). The exchange administrator identifies the universe of potential users (employees, and/or administrators) who are candidates for either screeners, approvers, or both. The SAS system then randomly selects the two roles with each new incident. The purpose of this constantly changing mapping is to provide a hurdle for employees and/or administrators to collude on their response on any given flagged scenario, or for third parties to try and influence their decisions on any given flagged scenario.

In example embodiments, there are restrictions for deactivating the SAS system. To allow for trades to continue as normal after a pause for review or a kill switch halt, two people are again flagged. A first person initiates a restart ("Initiator") and a second person to approve the go live state ("Go Live Verifier"). The same constantly changing mapping algorithm is used to randomly assign these roles with each new instance. Again, the purpose of this smart randomization is to increase the integrity in the system by reducing the ability for bad actors to influence known or previously-identified decision makers.

In example embodiments, the SAS system is constantly running and actively checking for any flags within the exchange ecosystem. As described herein, one or more flags can represent "inside" flags corresponding to "inside" factors of system 100 or "outside" (external) flags corresponding to factors of system 100, for example, initiated by a human participant. For example, an ATS risk management system flags a specific user for suspicious trading, which is flagged to the SAS system. The SAS system then communicates this downstream to the broker dealer (BD) and the transfer agent (TA). As another example, an exchange administrator learns of a massive power outage affecting the West, Southwest, and Midwest in the evening, and initiates review with the SAS system.

The SAS system notifies all systems downstream (e.g., ATS, BD, and/or TA, depending on the instance) that a kill switch has been initiated. At that point, the transaction(s) in question will not settle. Users will be notified via email, in an application, or via a mobile telephone. The user's account will be reset to what it was prior to the translation starting. The account ledger and cap table are updated to the version prior to the transaction starting (e.g., no funds will move and no shares will be transferred). If the shares were listed for sale, the shares will be shown as listed again. The SAS system is able to provide a time stamp for the ledgers and logs within the ATS, BD, and TA. This time stamp allows these systems to examine the ledgers and logs immediately prior to the time stamp and return users to a pre-SAS state.

Figure 9:
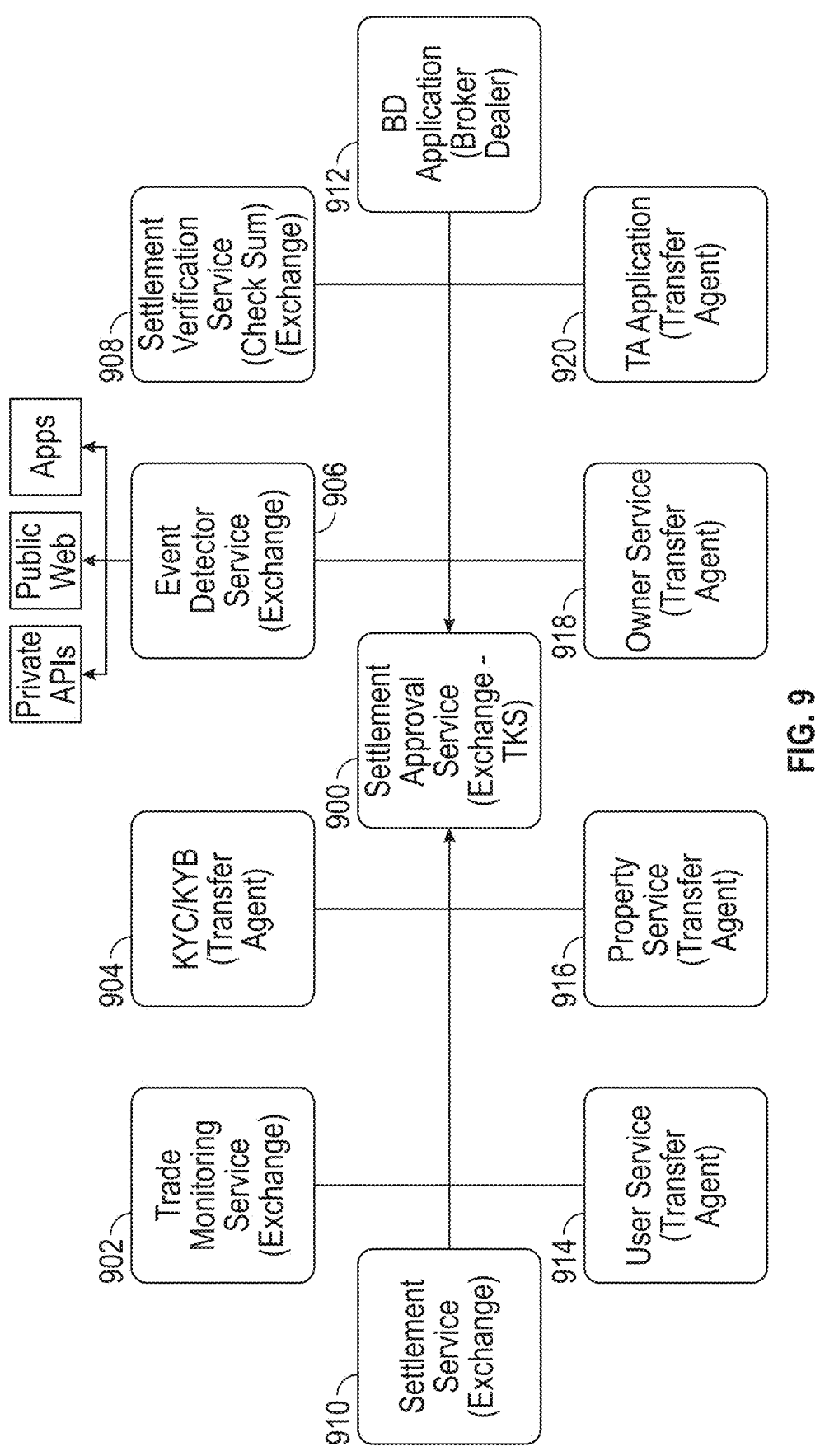
FIG. 9 illustrates am example Settlement Approval Service (SAS).

FIG. 9 illustrates a settlement approval service (SAS) 900, according to some embodiments of the disclosed technology. Settlement approval service (SAS) 900 can be implemented at and/or using the components of system 100. As such, settlement approval service (SAS) 900 is suitable for use with the components and methods depicted in FIGS. 1 and 5-7.

Generally, per transaction and in view of corresponding transaction data, system 100 maximizes transaction efficiency, maximizes transaction accuracy, and prevents inappropriate transactions. System 100 leverages automation to check transaction accuracy and transaction appropriateness reducing human intervention. Leveraging automation and minimizing human interaction increases transaction processing efficiency, even when transaction accuracy and/or transaction appropriateness is in question. System 100 also manages resources allocated to paused transactions facilitating more efficient transaction processing when a paused transaction is subsequently unpaused or killed.

Referring to FIG. 9, settlement approval service 900 collects (or intercepts) data from different services across the different environments using an API interface to interconnect an ATS, one or more broker dealers (BD), such as the broker dealer of transaction ATS broker/dealer 130, and one or more transfer agents (TA), such as transfer agent 106. In general, depending on the collected data, settlement approval service 900 has the ability to prevent future trades and/or throttle (temporarily pause and then unpause) future trades, which sends the trades to manual review.

In example embodiments, the settlement approval service (SAS) 900 includes trade monitoring service (exchange) 902, a KYC/KYB (transfer agent) 904, an event detector service (exchange) 906, a settlement verification service (check sum) (exchange) 908, a settlement service (exchange) 910, a BD application (Broker Dealer) 912, a user service (transfer agent) 914, a property service (transfer agent) 916, an owner service (transfer agent) 918, and TA Application (transfer agent) 920.

In more specific aspects, trade monitoring service 902 monitors initiated and/or in-process trades (transactions) at an ATS (e.g., system 100). Trade monitoring service 902 can detect a transaction between a purchasing entity and a selling entity based on the monitoring, including monitoring computing resources at the ATS and/or monitoring computing resources allocated to the transaction. Trade monitoring service 902 can intercept transaction data associated with the transaction and that is being transferred between and/or stored at ATS computing resources (e.g., system memory resources, storage resources, and network resources). In one aspect, monitoring service 902 pauses progression (e.g., towards settlement) of the monitored transaction. When progression of a transaction is paused, at least some ATS computing resources allocated for progressing the transaction can, at least temporarily, remain allocated and held for the transaction during validation checking.

Holding ATS computing resources allocated to a paused transaction allows transaction progress to resume more efficiently when the paused transaction is subsequently unpaused. For example, computing resource data and configurations, such as, memory pointers, address identifiers, network packets, durable storage sectors, etc. may already be known. When a transaction is unpaused, the computing resource data and configurations can be used allowing a transaction to essentially restart where it left off.

Intercepted transaction data corresponding to a paused transaction can be automatically, manually, or otherwise checked for compliance with compliance conditions (e.g., no association with outside factors/flags, no association with inside factors/flags, etc.). In one aspect, monitoring service 902 makes various automated determinations about the appropriateness of a transaction based on intercepted transaction data. For example, monitoring service 902 can determine that a transaction is compliant, that a transaction is non-compliant, or that it is ambiguous whether a transaction is compliant or non-compliant.

In aspects, a determination of compliance or non-compliance by monitoring system 902 is considered authoritative by other components of system 100 (increasing subsequent processing efficiencies). For example, a transaction can be allowed to settle without further human intervention or a transaction can be killed without further human intervention. In other aspects, determinations of monitoring system 902 are sent for human verification and/or further human investigation. In these other aspects, transaction efficiency may be of reduced relevance. Further, in these other aspects a human may verify a determination of monitoring system 902, override a determination of monitoring system 902, or investigate a determination of monitoring system 902. It may be that an investigation precedes verification or override of monitoring system 902.

Monitoring Service Compliance Determination

Thus, it may be that trade monitoring service 902 checks (validates) compliance of a paused transaction automatically by comparing the intercepted transaction data to compliance conditions without human interaction. In one aspect, trade monitoring service 902 automatically determines, based on a compliance check, that intercepted transaction data corresponding to a paused transaction complies with compliance conditions. For example, trade monitoring service 902 can validate that the intercepted transaction data is not associated with any outside or inside factors/flags.

Upon validating transaction compliance, trade monitoring service 902 can automatically unpause the paused transaction without human intervention. Alternately, upon validating transaction compliance, trade monitoring service 902 can alert a human screener and/or human approver for further compliance verification. Through manual checking of intercepted transaction data to compliance conditions, it may be that a human screener or human approver verifies trade monitoring service 902's determination of compliance.

Upon human verification of transaction compliance, a paused transaction can be unpaused. For example, upon verification, the human screener and/or human approver can electronically and/or digitally notify trade monitoring service 902. In response to the notification, trade monitoring service 902 can automatically unpause the paused transaction without further human intervention. Alternately, upon verification, the human screener and/or human approver can submit electronic and/or digital commands at the ATS to unpause the paused transaction.

When a transaction is unpaused, the transaction can again progress using held ATS computing resources previously allocated to the transaction. Utilizing held computing resources allows transaction progress to resume more efficiently (relative to allocating new computing resources) when the paused transaction is unpaused.

However, it may also be that a human screener or human approver overrides trade monitoring service 902's determination of compliance (e.g., identifying an association between the transaction data and an outside or inside factor/flag). When a human overrides trade monitoring service 902's determination, the paused transaction can be killed. For example, upon override, the human screener and/or human approver can electronically and/or digitally notify trade monitoring service 902 of non-compliance. In response to the notification, trade monitoring service 902 can automatically kill the paused transaction without further human intervention. Alternately, upon override, the human screener and/or human approver can submit electronic and/or digital commands at the ATS to kill the paused transaction.

When a transaction is killed, held ATS computing resources previously allocated to the transaction can be released and reused for other operations at the ATS.

Monitoring Service Ambiguity Determination

It may also be that trade monitoring service 902 is unable to determine, based on a compliance check, that intercepted transaction data corresponding to a paused transaction complies with compliance conditions. For example, trade monitoring service 902 may identify ambiguity with respect to an association between the intercepted transaction data and any external or inside factors/flags. Upon detecting ambiguity, trade monitoring service 902 can alert a human screener and/or human approver for further compliance verification. Through manual checking of intercepted transaction data to compliance conditions, it may be that a human screener or human approver determines that a paused transaction is compliant (thereby removing the ambiguity). For example, a human screener or human approver can determine that intercepted transaction data is not associated with any outside or inside factors/flags.

Upon human determination of transaction compliance, a paused transaction can be unpaused. For example, upon determination of transaction compliance, the human screener and/or human approver can electronically and/or digitally notify trade monitoring service 902. In response to the notification, trade monitoring service 902 can automatically unpause the paused transaction without further human intervention. Alternately, upon notification, the human screener and/or human approver can submit electronic and/or digital commands at the ATS to unpause the paused transaction.

When a transaction is unpaused, the transaction can again progress using held ATS computing resources previously allocated to the transaction. Utilizing held resources allows transaction progress to resume more efficiently (relative to allocating new computing resources).

On the other hand, through manual checking of intercepted transaction data to compliance conditions, it may be that a human screener or human approver determines that a paused transaction is not compliant (thereby removing the ambiguity). For example, a human screener or human approver can determine that intercepted transaction data is associated with an outside or inside factor/flag.

When a human determines a paused transaction is non-compliant, the paused transaction can be killed. For example, upon human determination of non-compliance, the human screener and/or human approver can electronically and/or digitally notify trade monitoring service 902 of non-compliance. In response to the notification, trade monitoring service 902 can automatically kill the paused transaction without further human intervention. Alternately, upon human determination of non-compliance, the human screener and/or human approver can submit electronic and/
or digital commands at the ATS to kill the paused transaction.

When a transaction is killed, held ATS computing
resources previously allocated to the transaction can be
released and reused for other operations at the ATS.

Monitoring Service Non-Compliance Determination

It may further be that trade monitoring service 902
determines, based on a compliance check, that intercepted
transaction data corresponding to a paused transaction does
not comply with compliance conditions. For example, trade
monitoring service 902 may identify an association between
the intercepted transaction data and one or more outside
factors/flags and/or one more inside factors/flags. Upon
detecting non-compliance, trade monitoring service 902 can
automatically kill the paused transaction without human
intervention.

Alternately, upon detecting non-compliance, trade monitoring service 902 can alert a human screener and/or human
approver for further investigation. Through manual checking of intercepted transaction data to compliance conditions,
it may be that a human screener or human verifies that a
paused transaction is non-compliant.

When a human verifies non-compliance, the paused transaction can be killed. For example, upon human verification
of non-compliance, the human screener and/or human
approver can electronically and/or digitally notify trade
monitoring service 902 of verification. In response to the
notification, trade monitoring service 902 can automatically
kill the paused transaction without further human intervention. Alternately, upon human verification of non-compliance, the human screener and/or human approver can submit
electronic and/or digital commands at the ATS to kill the
paused transaction.

When a transaction is killed, held ATS computing
resources previously allocated to the transaction can be
released and reused for other operations at the ATS.

However, it may also be that a human screener or human
approver overrides trade monitoring service 902's determination of non-compliance. For example, a human screener or
human approver can determine that intercepted transaction
data is not associated with any outside or inside factors/flags.
When a human overrides trade monitoring service 902's
determination, the paused transaction can be unpaused. For
example, upon override, the human screener and/or human
approver can electronically and/or digitally notify trade
monitoring service 902 of compliance. In response to the
notification, trade monitoring service 902 can automatically
unpause the paused transaction without further human intervention. Alternately, upon override, the human screener
and/or human approver can submit electronic and/or digital
commands at the ATS to unpause the paused transaction.

When a transaction is unpaused, the transaction can again
progress using held ATS computing resources previously
allocated to the transaction. Utilizing held resources allows
transaction progress to resume more efficiently (relative to
allocating new computing resources).

In generally, trade monitoring service 902 can monitor
transactions at system 100, intercept corresponding transaction data, and check transaction compliance automatically
on an on-going basis and/or in essentially real-time. In one
aspect, trade monitoring service is a daemon or other background process that runs continuously monitoring transactions, intercepting corresponding transaction data, and
checking transaction compliance.

Trade monitoring service 902 can electronically/digitally
intercept transaction data in transit between and/or when stored at any of the components depicted in system 100. For
example, trade monitoring service 902 can electronically/
digitally intercept transaction data in transit between and/or
when stored at any of the modules, wallets, bank accounts,
ledgers, websites, backend servers, transfer agents, transfer
agents, etc. depicted in system 100.

Figure 10A:
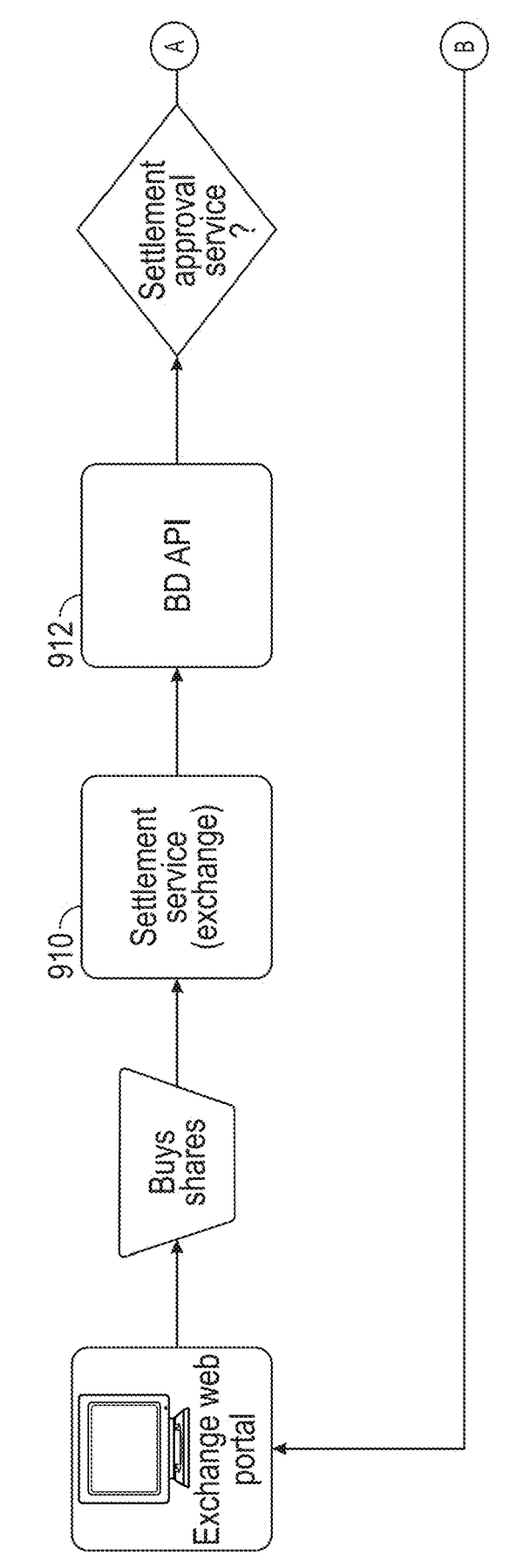
FIGS. 10A, 10B, and 10C collectively illustrate am example kill flow in a transaction.
Figure 10B:
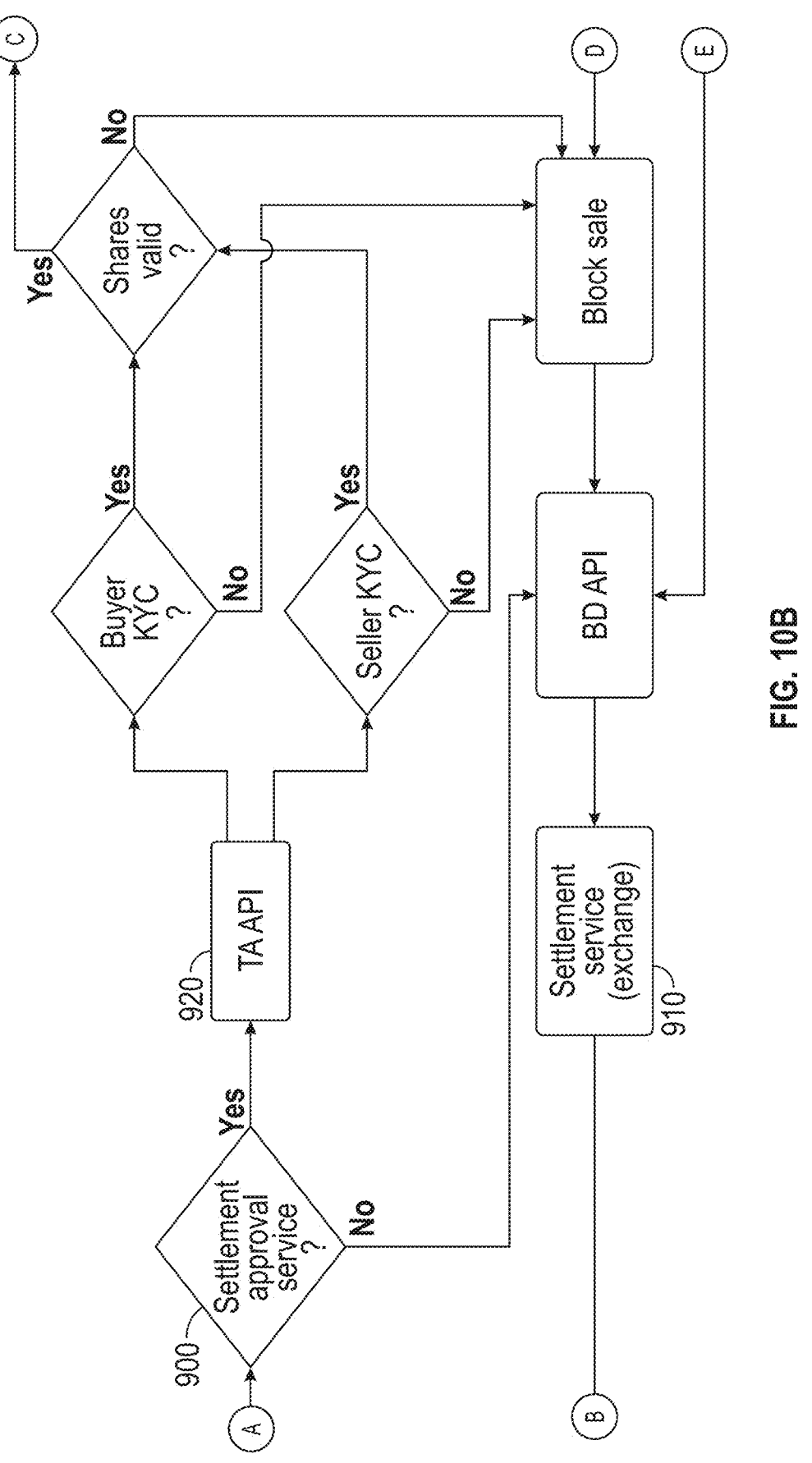
Figure 10C:
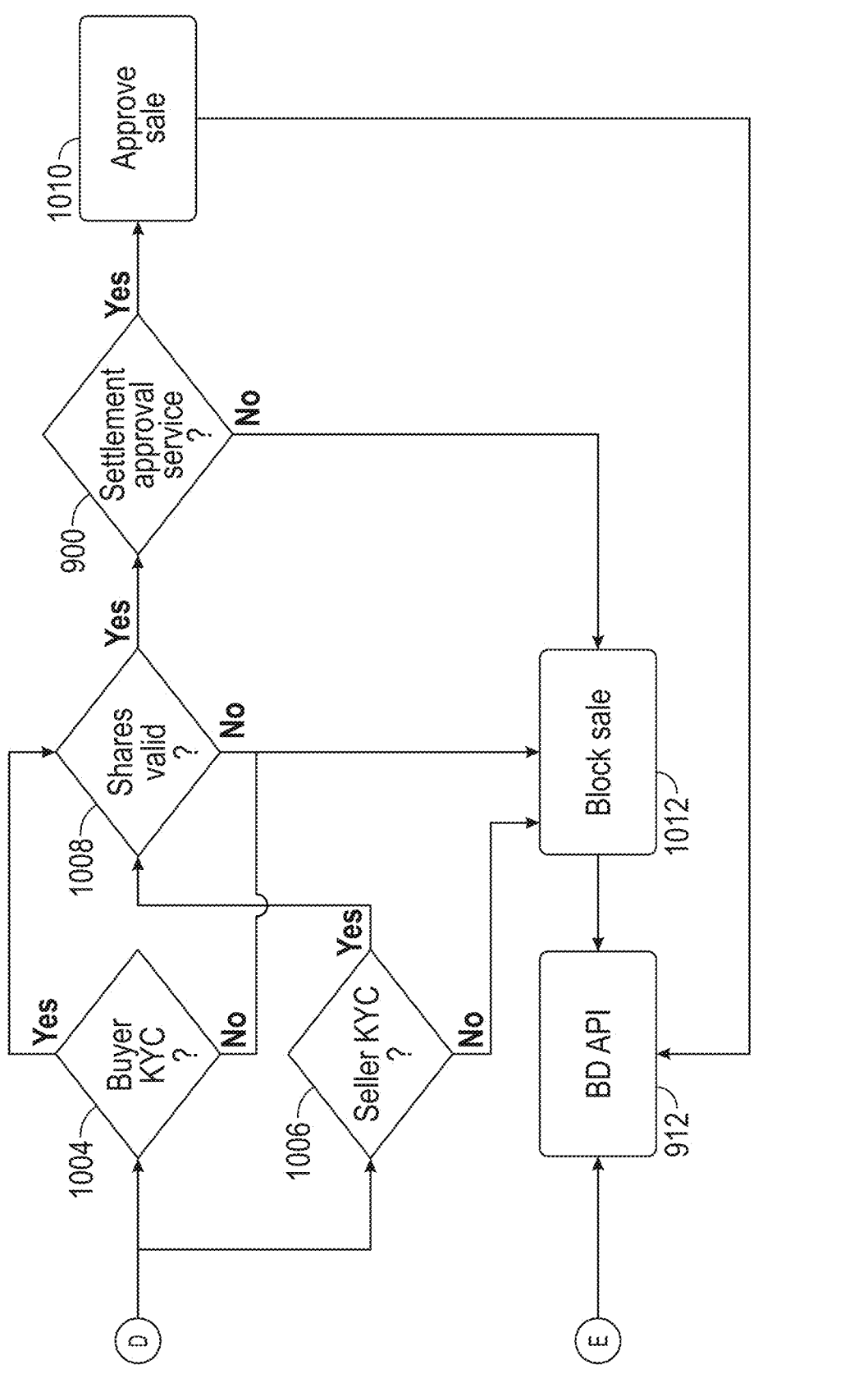

FIGS. 10A, 10B, and 10C collectively illustrate kill flow
1000 in a transaction, according to some embodiments of the
disclosed technology. Kill flow 1000 can implemented at
and/or using the components of system 100. As such, kill
flow 1000 is suitable for use with the components and
methods depicted in FIGS. 1 and 5-7 and the settlement
approval service 900 of FIG. 9. Referring to FIGS. 10A,
10B, and 10C, in example embodiments during a transaction, the exchange, through a series of APIs, requests from
the broker dealer and the transfer agent, approval to complete the transaction. If along the way, for any reason, the
settlement approval service rejects the trade, the exchange
cancels the transaction. For example, components of settlement approval service 900, such as, trade monitoring service
902, can detect an association between a transaction and an
outside or inside factor/flag.

More specifically, in example embodiments, at 1002 the
settlement approval service 900 queries the transfer agent
920 whether the buyer is approved, e.g., verified through
KYC (1004), and the seller is approved, e.g., verified
through KYC (1006). If both the seller and buyer are
approved, the settlement approval service queries at 1008
the transfer agent 920 as to whether the shares offered for
sale are valid. If the shares are valid, the settlement approval
service 900 approves the sale at 1010. However, if, at 1004
the buyer is not approved, at 1006 the seller is not approved,
or at 1008, the shares are not valid, the settlement approval
service 900 blocks the sale and the transaction is terminated
at 1012. The settlement approval service 900 notifies the
broker dealer 912 whether the sale was blocked and the
transaction was terminated at 1012 or the sale was approved
and the transaction was settled at 1010.

For example, trade monitoring service 902 can intercept
data flowing between buyer KYC 1004, seller KYC 1006,
the query of transfer agent 920. Trade monitoring service
920 can check the intercepted data for association with an
outside factors/flag and inside factors/flags. When no association is identified, the transaction can be approved. When
an association is identified, the transaction can be killed. The
transaction may be killed without pausing the transaction.

Figure 11A:
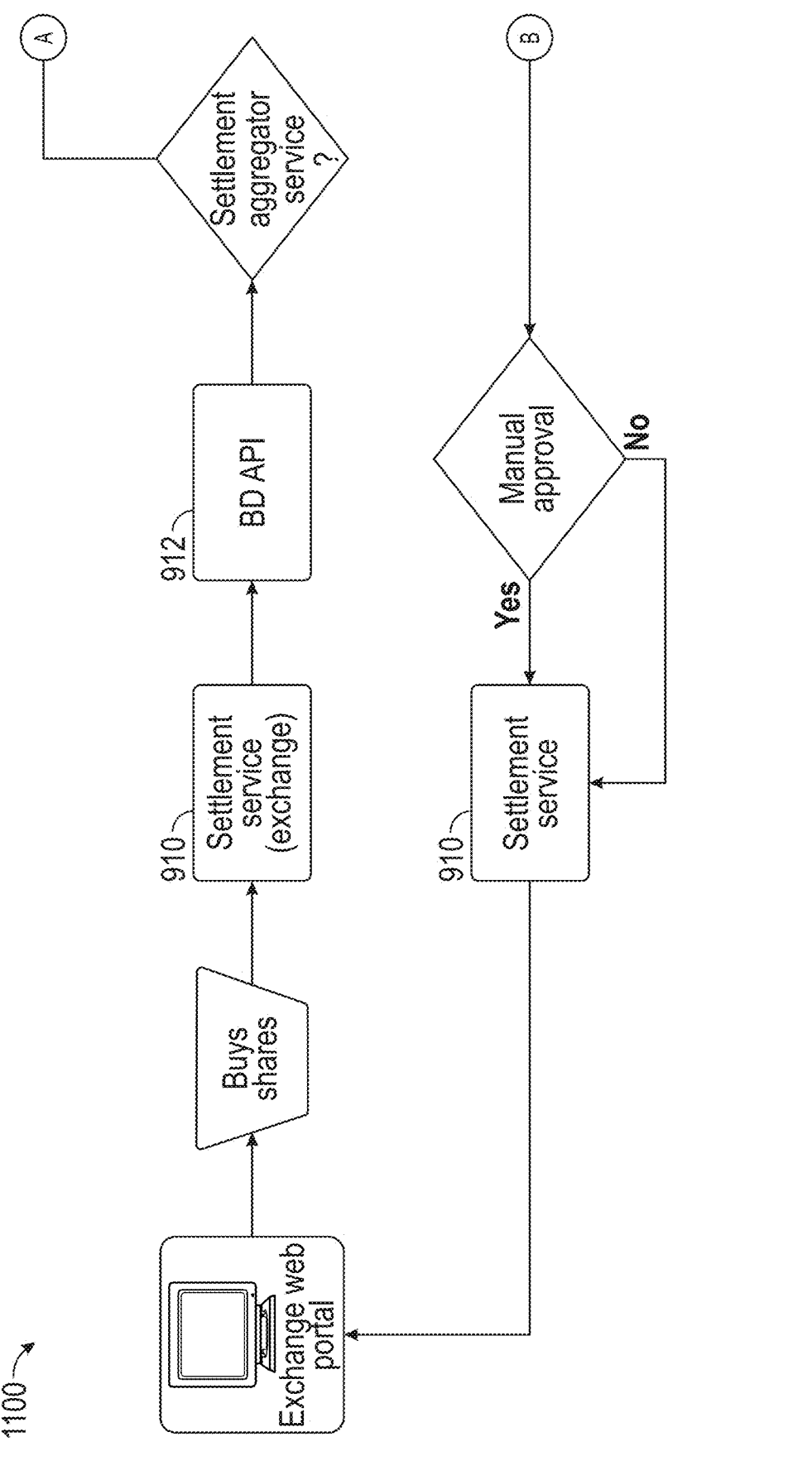
FIGS. 11A, 11B, and 11C collectively illustrate am example throttle (pause/unpause) flow in a transaction.
Figure 11B:
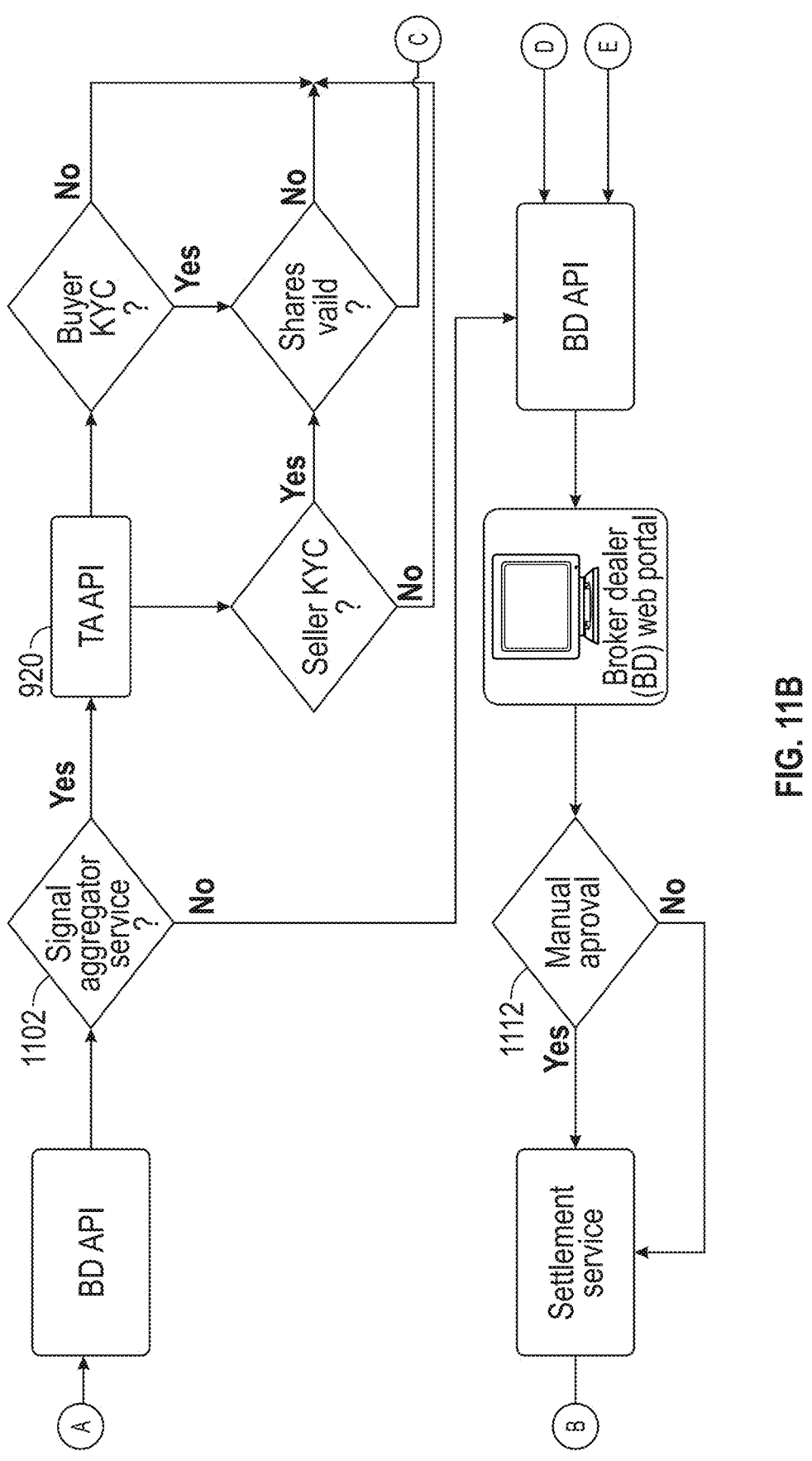
Figure 11C:
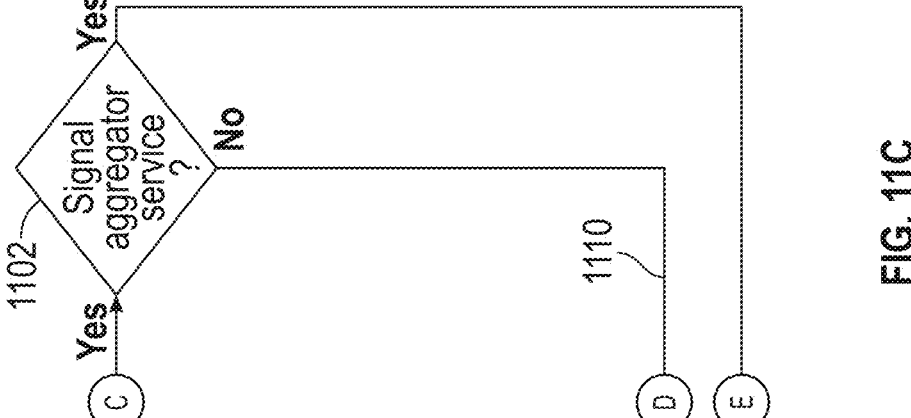

FIGS. 11A, 11B, and 11C collectively illustrate a throttle
flow 1100 in a transaction, according to some embodiments
of the disclosed technology. Throttle flow 1100 can be
implemented at and/or using the components of system 100.
As such, throttle flow 1100 is suitable for use with the
components and methods depicted in FIGS. 1 and 5-7 and
the settlement approval service 900 of FIG. 9. Generally, a
throttle flow can include pausing and subsequently unpausing a transaction.

Referring to FIGS. 11A, 11B, and 11C, in example
embodiments during a transaction, the exchange, through a
series of APIs, requests from the broker dealer (BD) 912 and
the transfer agent (TA) 920 approval to complete the transaction. In some aspects, if along the way, signal aggregator
service 1102 pauses the trade, signal aggregator service 1102
can also transmit the trade for manual review. Broker dealer
912 receives a notification to review the transaction before
allowing the trade to settle. For example, components of
settlement approval service 900, such as, trade monitoring
service 902, can detect an association between a transaction
and an outside or inside factor/flag. The exchange then either allows the transaction to settle or cancels (kills) the transaction pending the decision from broker dealer 912.

More specifically, in example embodiments, at signal aggregator service 1102 queries transfer agent 920 whether the buyer is approved, e.g., verified through KYC (1104), and the seller is approved, e.g., verified through KYC (1106). If both the seller and buyer are approved, signal aggregator service 1102 queries at transfer agent 920 as to whether the shares offered for sale are valid. If the shares are valid or invalid, signal aggregator service 1102 transmits to broker dealer 912 an indication as such. However, if, the shares are not valid, the signal aggregator service 1102 pauses the trade. Signal aggregator service 1102 can also transmit at 1110 a notification through broker dealer 910 that the trade is subject to manual review at 1112 before allowing the trade to settle. Settlement service 910 receives a notification that after manual review at 1112 the transaction is allowed to continue to settlement (and is unpaused) or the transaction is canceled (killed), the decision of which is transmitted to the exchange web portal to notify the user.

For example, trade monitoring service 902 can intercept data flowing between buyer KYC 1104, seller KYC 1106, the query of transfer agent 920. Trade monitoring service 920 can check the intercepted data for association with an outside factors/flag and inside factors/flags. When no association is identified, the transaction can be approved. When an association is identified, the transaction can be paused, for example, for manual review. Based on results of manual review, the transaction can be approved (no association identified) or killed (association identified).

In one aspect, throttle flow 1100 is implemented for a transaction. Throttle flow 1100 pauses the transaction. Subsequently, the transaction is validated, unpaused, and continues to settlement.

In another aspect, throttle flow 1100 is implemented for a transaction. Throttle flow 1100 pauses the transaction. Subsequently, kill flow 1000 is then implemented for the transaction. Kill flow 1000 kills the transaction.

Figure 12:
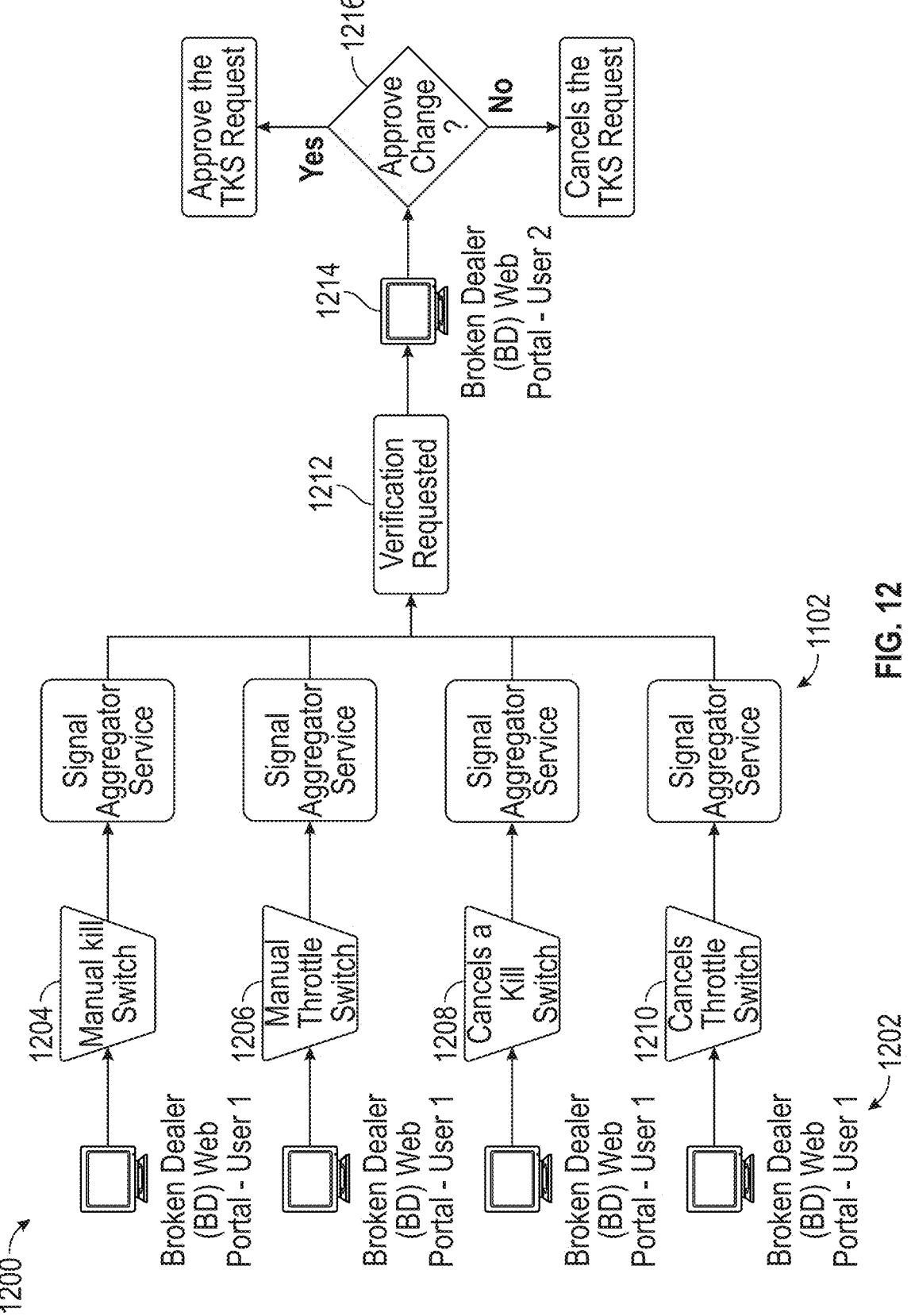
FIG. 12 illustrates an example throttle (pause/unpause) and kill switch system.

FIG. 12 illustrates a throttle and kill switch system 1200, according to some embodiments of the disclosed technology. Throttle and kill switch system 1200 be implemented at and/or using the components of system 100. As such, throttle and kill switch system 1200 is suitable for use with the exemplary transaction platform of the systems in FIGS. 1 and 5-7, and the settlement approval service 900 of FIG. 9. Referring to FIG. 12, in example embodiments during a transaction, the broker dealer portal allows one or more users, e.g., a user 1, to throttle or kill a current transaction and/or future transactions. This process allows one or more users to throttle or kill individual trades, a set of trades, or all trades.

In doing so, system 1200 processes a series of actions and requires secondary approval from another designated user, e.g., user 2, on the broker dealer portal. The process may be the same to cancel a throttle or kill command. As shown in FIG. 12, broker dealer web portal 1202 is communicatively coupled to signal aggregator service 1102 and configured to transmit to signal aggregator service 1102 one of a plurality of command signals including manual kill switch signal 1204, manual throttle switch signal 1206, cancel kill switch signal 1208, or cancel throttle switch signal 1210. At 1212, verification of the command signal is requested and another broker dealer web portal 1214 for user 2 either approves or cancels the SAS request at 1216.

Accordingly, in general, aspects of the invention can: (a) kill a transaction without first pausing the transaction, (b) pause a transaction and then kill the transaction, or (c) pause a transaction and then unpause the transaction. A transaction can be killed, paused, unpaused or any combination thereof at any transaction stage.

Figure 13:
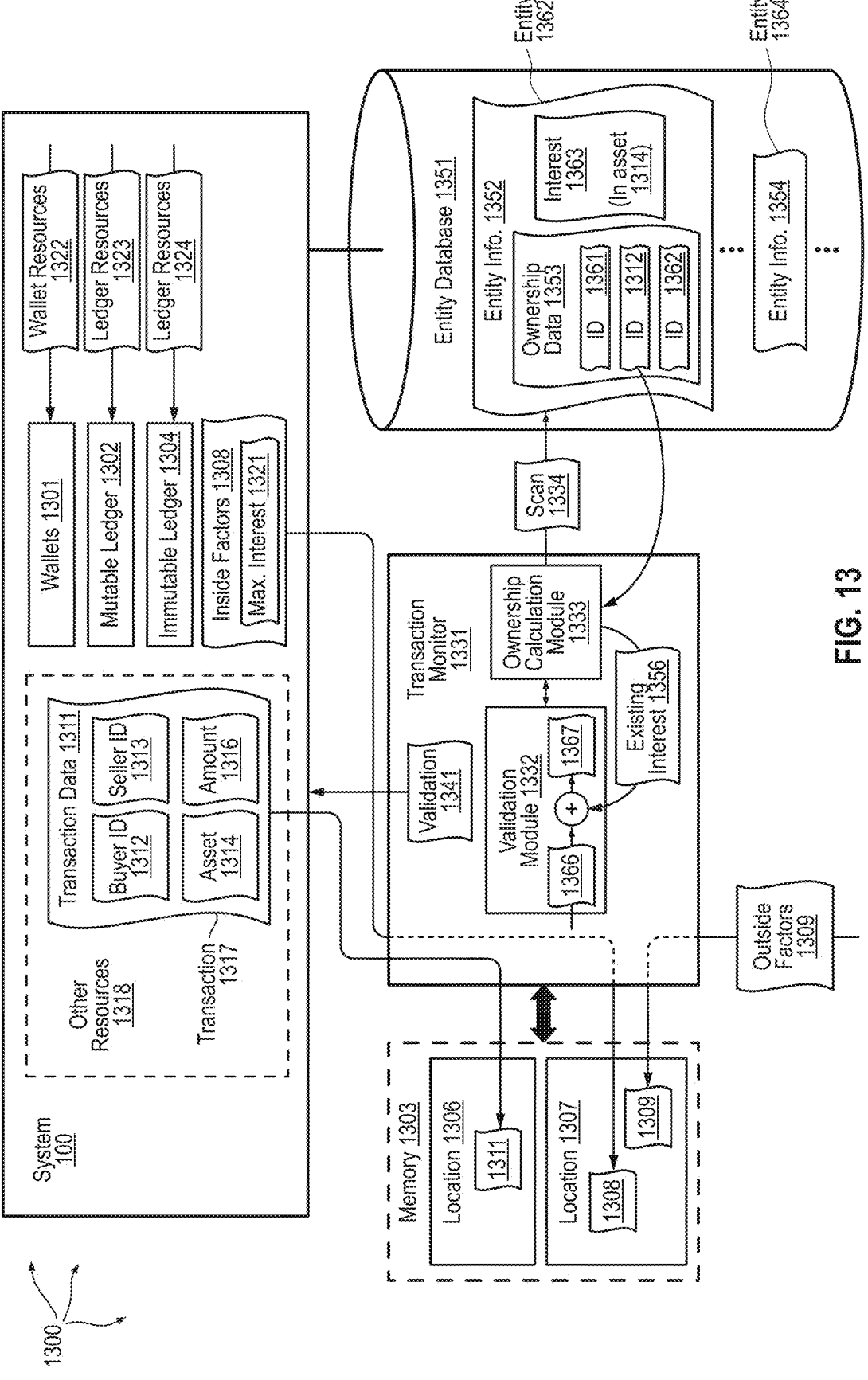
FIG. 13 illustrates an example computer architecture that facilitates automated computing resource allocation and comparison validating ownership and transaction completion.

FIG. 13 illustrates a computer architecture 1300 that facilitates automated computing resource allocation and comparison validating ownership and transaction completion. Computer architecture 1300 can be implemented at and/or using the components of system 100. As such, computer architecture 1300 is suitable for use with and/or can interoperate with the components and methods depicted in FIGS. 1, 5-7 and 9-12.

As depicted computer architecture 1300 includes system 100, transaction monitor 1331, memory 1303, entity database 1351, and outside factors 1309. System 100 further includes wallets 1301, mutable ledger 1302, immutable ledger 1308, and inside factors 1308. Wallets 1301 can include any of the wallets, bank accounts, or custodies as described. Mutable ledger 1302 can be similar to primary ledger 102. Immutable ledger 1304 can be similar to secondary ledger 104.

Inside factors 1308 can include any inside factors/flags as described herein and also includes maximum (ownership) interest 1321, representing a maximum fractional ownership interest an individual is allowed to obtain in asset 1314. Outside factors 1309 can include any outside factors/flags as described herein. Collectively inside factors 1308 and/or outside factors 1039 can represent asset ownership conditions. For a transaction to settle at system 100, the transaction may have to comply with the asset ownership conditions.

Transaction monitor 1331 further includes validation module 1332 and ownership calculation module 1333. As depicted, transaction monitor 1331 is situated separate from system 100 can independently monitor transactions in-process at system 100. In other aspects, transaction monitor 1331 can be included in the components of system 100. In one aspect, transaction monitor 1331 is configured similarly to trade monitoring service 902 and can implement functionality described with respect to trade monitoring service 902. For example, trade monitor 1331 can monitor transactions at system 100, intercept corresponding transaction data, check transaction compliance, pause transactions, unpause transactions, and kill transactions automatically on an on-going basis and/or in essentially real-time.

Validation module 1332 is configured to compare a memory location storing transaction data to a memory location storing transaction compliance conditions (e.g., asset ownership conditions) and, from the comparison, determine if a transaction complies with the compliance conditions. In one aspect, compliance conditions are inside factors/flags and/or outside factors/flags as described.

System 100 maintains entity database 1351. Entity database 1351 stores entity information about users of system 100. Entity data 1351 can store information about businesses as well as individuals. For example, entity database 1351 stored entity information 1352 about a first business and entity information 1354 about second business. Entity information 1352 further stores ownership data 1353 and interest 1363 (in asset 1314). Ownership data 1353 indicates that individuals corresponding to IDs 1361, 1312, and 1362 have an ownership interest in the first business and can also represent an amount of ownership interest in the first business (e.g., as a percentage). Interest 1363 indicates an amount (e.g., in fiat currently, crypto currency, or tokens) or a percentage of ownership the first business has in asset 1314. Entity database can also include entity information for additional businesses as well as for individuals.

In general, ownership calculation module 1333 determines ownership interests in assts from data in entity database 1351. Ownership calculation module 1333 can scan entity database 1351 for entity information and, form scanned entity information, at least estimate or approximate (or in some aspects calculate) an individual's existing ownership (amount or percentage) in an asset. Ownership calculation module 1333 can estimate or approximate (or calculate) an individual's existing ownership in an asset based on: (1) the individual's ownership of the asset as a person (if any) and (2) the individual's (e.g., percentage) ownership in a business in view of the business's ownership interest in the asset (if any). An individual may have ownership in an asset through multiple businesses.

Transaction monitor 1331 and/or validation modules 1332 can utilize memory 1303 to compare memory locations storing individual IDs to memory locations storage compliance conditions, such as, inside factors/flags and/or outside factors/flags. When transaction monitor 1331 detects a transaction at system 100, transaction monitor 1331 can allocate memory locations in memory 1303. Transaction monitor 1331 can allocate one memory location to store user IDs and another memory location to store compliance conditions.

In general, compliance conditions may change less frequently than new transactions occur at system 100. As such, transaction monitor 1331 can cache compliance conditions for some amount of time. Caching compliance conditions can reduce processing load by reducing repetitive accessing and storing compliance conditions and allocating and releasing memory locations to store the compliance conditions. Transaction monitor 1331 can access and refresh compliance conditions in a memory location at a specified time interval ranging from one minute to one day.

System 100 can allocate and release resources related to initiating transactions, performing transactions (through various transaction stages), settling transactions, updating transaction related data (e.g., cap tables), and documenting transaction outcomes (e.g., in ledgers). More broadly, computer architecture 1300 can also allocate and release resources for determining compliance with compliance conditions, pausing transactions, unpausing transactions, and killing transactions. Generally, allocating and releasing resources can be tailored to both promote and balance transaction efficiency, transaction accuracy, and transaction appropriateness (i.e., whether or not a transaction is allowed settle).

FIG. 14 illustrates a flow chart 1400 of an example method for automated computing resource allocation and comparison validation ownership and transaction completion. Method 1400 will be described with respect to the components and data in computer architecture 1300. As such, method 1400 is suitable for use with the exemplary transaction platform of the systems in FIGS. 1 and 5-7, and the settlement approval service 900 of FIG. 9.

Method 1400 includes accessing transaction data corresponding to a transaction initiated at an ATS and between a purchasing entity, requesting purchasing a fractional interest in an asset from a selling entity, and the selling entity (1401). For example, transaction monitor 1331 can intercept transaction data 1311 occurring at system 100 (e.g., as part of continuously and/or on-going monitoring of system 100) and corresponding to a transaction 1317 between buyer ID 1312 and seller ID 1313. Transaction data 1311 can represent transaction 1317 where buyer ID 1312 is requesting purchase of amount 1316 of asset 1314 from seller ID 1313. Amount 1316 of asset 1314 can be quantified by one or more tokens currently possessed by seller ID 1313 and representing a fractional ownership interest in asset 1314.

In one aspect, system 100 allocates other resources 1318 (e.g., one or more of processor resources, memory resources, durable storage resources, network resources, etc.) for performance of transaction 1317 and stages thereof. System 100 can use other resources 1318 as appropriate to move transaction 1317 through different transaction stages toward settlement. If transaction 1317 is paused, other resources 1318 can be held during the pause so that transaction 1317 can proceed more efficiently if/when transaction 1317 is subsequently unpaused.

In one aspect, transaction monitor 1331 monitors other resources 1318. Transaction monitor 1331 detects transaction 1317 based on the monitoring other resources 1318. Automatically, without user intervention, and in response to detecting transaction 1317, transaction monitor 1331 intercepts transaction data 1311. Transaction monitor 1331 can pause transaction 1317 (for validation checking) in response to detecting transaction 1317. Upon transaction 1317 being paused, system 100 can hold other resources 1318 for transaction 1317.

Method 1400 includes automatically and without user intervention validating that settlement of the transaction is permitted in view asset ownership conditions defined for the asset (1402). For example, transaction monitor 1331 can, automatically and without user intervention, validate (or not validate) that settlement of transaction 1317 is permitted in view of inside factors 1308 and outside factors 1309.

Act 1402 includes loading the transaction data into a memory location within system memory (1403). For example, transaction monitor 1331 can allocate memory location 1306 in memory 1304. Transaction monitor 1331 can load transaction data 1311 into memory location 1306. Act 1402 includes identifying one or more identifiers within the transaction data in the system memory location, each identifier uniquely corresponding to an individual that is part of the transaction (1404). For example, transaction monitor 1331 can identify buyer ID 1312 and seller ID 1313 within transaction data 1311 in memory location 1306. Buyer ID 1312 can uniquely correspond to an individual buyer of amount 1316 of asset 1314 (the one or more tokens). Seller ID 1313 can uniquely correspond to an individual seller of amount 1316 of asset 1314 (the one or more tokens).

Act 1402 can include loading the asset ownership conditions into another memory location within system memory (1405). For example, transaction monitor 1331 can allocate memory location 1307 in memory 1304. Transaction monitor 1331 can load inside factors 1308 and outside factors 1309 into memory location 1307. Act 1402 includes comparing the system memory location to the other system memory location comparing the one or more identifiers to the asset ownership conditions (1406). For example, validation module 1332 can compare memory location 1306 to memory location 1307 comparing buyer ID 1312 and seller ID 1313 to inside factors 1308 and outside factors 1309.

Act 1402 can include validating transaction compliance with the asset ownership conditions in view of comparing the system memory location to the other system memory location (1407). For example, validation module 1332 can validate (or not validate) compliance of transaction 1317 with inside factors 1308 and/or outside factors 1309 based on the comparison of memory location 1306 and memory location 1307. Upon validation, validation module 1332 can send validation 1341 to system 100.

Upon validation, transaction monitor 1331 can also unpause transaction 1317. In response to transaction 1317 being unpaused, system 100 can resume use of other resources 1318 to settle transaction 1317.

Method 1400 includes in response to validating transaction compliance, auto-allocating ATS resources, including mutable ledger resources, immutable ledger resources, and digital wallet resources, for settlement of the transaction (1408). For example, system 100 can auto-allocate wallet resources 1322 to wallets 1301, ledger resources 1323 to mutable ledger 1302, and ledger resources 1324 to immutable ledger 1364, for settlement of transaction 1317.

Method 1400 includes settling the transaction in accordance with the transaction data and utilizing the allocated ATS resources (1409). For example, system 100 can settle transaction 1317 in accordance with transaction data 1311 and utilizing wallet resources 1322, ledger resources 1323, and ledger resources 1324.

Act 1409 includes electronically transferring a token from an ATS managed digital wallet of the selling entity to an ATS managed digital wallet of the purchasing entity utilizing the allocated digital wallet resources (1410). For example, as part of settling transaction 1317, system 101 can electronically transfer one or more tokens representing a fractional interest in asset 1314 from a digital wallet of seller ID 1313 to a digital wallet of buyer ID 1312 utilizing wallet resources 1322. Additionally, as part of settling transaction 1317, system 100 can electronically transfer fiat currency and/or crypto currency from a wallet (or wallets) of buyer ID 1312 to a wallet (or wallets) of seller ID 1313 utilizing wallet resources 1322.

Act 1409 includes documenting transaction settlement in the mutable ledger utilizing the mutable ledger resources (1411). For example, system 100 can digitally document settlement of transaction 1317 in mutable ledger 1302 utilizing ledger resources 1323. Act 1409 includes automatically partially syncing the documented transaction settlement from the mutable ledger to the immutable ledger using both the mutable ledger resources and the immutable ledger resources (1412). For example, system 100 can semi-redundantly (e.g., without PII) sync digital documentation of settlement of transaction 1317 from mutable ledger 1302 to immutable ledger 1304 using both ledger resources 1323 and ledger resources 1324.

Method 1400 includes releasing the allocated ATS resources and the memory locations upon settlement of the transaction (1413). For example, system 100 can release wallet resources 1322, ledger resources 1323, ledger resources 1324, and other resources 1318 upon settlement of transaction 1317. Transaction monitor 1331 can release memory location 1306 and/or memory location 1307 upon settlement of transaction 1317. In one aspect, memory location 1306 is released and memory location 1307 remains allocated to cache inside factors 1308 and/or outside factors 1309.

It may be that transaction monitor 1331 pauses transaction 1317 during validation. Subsequent to validation, transaction monitor 1331 unpauses transaction 1317. However, it may also be that transaction monitor 1331 detects an association between transaction 1317 and one or more of inside factors 1308 and/or one or more of outside factors 1309. In response to a detected association, transaction monitor 1331 may not validate transaction 1317 and may instead automatically kill transaction 1317 or request human intervention and/or investigation into transaction 1317. Based on results of human intervention and/or investigation transaction monitor 1331 may then unpause or kill transaction

1317. During pause of transaction 1317 resources can be held for more efficient resumption of transaction 1317 upon unpause.

FIG. 15 illustrates a flow chart of an example method for automated computing resource allocation and comparison validating ownership. Method 1500 will be described with respect to the components and data in computer architecture 1300. As such, method 1500 is suitable for use with the exemplary transaction platform of the systems in FIGS. 1 and 5-7, and the settlement approval service 900 of FIG. 9.

Method 1500 includes loading a maximum fractional ownership in the asset per individual into system memory (1501). For example, transaction monitor 1331 can load maximum interest 1321 into memory location 1307. Method 1500 includes identifying an identifier corresponding to an individual within the transaction data (1502). For example, transaction monitor 1331 can identifier buy ID 1312 within transaction data 1311.

Method 1500 includes validating transaction compliance with asset ownership conditions (1503). For example, transaction monitor 1331 can validate compliance of transaction 1317 with ownership conditions of asset 1314.

Act 1503 includes scanning a database of entity data corresponding to a plurality of other entities (1504). For example, ownership calculation module 1333 can scan 1334 entity database 1351, including scanning entity information 1352, entity information 1354, etc. Act 1503 includes identifying an additional entity having an existing fractional interest in the asset from the scan (1505). For example, ownership calculation module 1333 can identify entity 1362 having (ownership) interest 1363 in asset 1314. Act 1503 includes identifying the identifier in the ownership data of the additional entity (1506). For example, ownership calculation module 1333 can identifier ID 1312 in ownership data 1353.

Act 1503 includes computing an anticipated combined fractional interest of the individual in the asset (1507). For example, ownership calculation module 1333 can compute an anticipated combined fractional interest of buyer ID 1312 in asset 1314 (if and/or in anticipation of transaction 1317 were to settle). Act 1507 includes estimating the individual's existing fractional interest in the asset in view of the entity's existing fractional interest in the asset and the ownership data (1508). For example, ownership calculation module 1333 can estimate existing interest 1356 (in asset 1314) in view of (ownership) interest 1363 and ownership data 1353. As a more specific example, it may be that entity 1362 owns 12% of asset 1314 and an individual corresponding to (buyer) ID 1312 owns one third of entity 1362. As such, ownership calculation module 1333 can estimate existing interest 1356 as a 4% interest in asset 1314 (i.e., the estimated existing interest of the individual corresponding to (buyer) ID 1312).

Act 1507 includes determining the individual's purported additional fractional interest in the asset in view of the transaction data (1509). For example, validation module 1332 can determine buyer ID 1312's purported additional fractional interest 1366 in asset 1314 from transaction data 1311. In one aspect, validation module 1332 refers to a capitalization table for asset 1314 to determine the capitalization of asset 1314. Validation module 1332 can determine purported additional fractional interest 1366 represented by amount 1316 (e.g., as a percentage) in view of the capitalization of asset 1314.

Act 1507 includes combining the estimate of the individual's existing fractional interest in the asset and the individual's purported additional interest in the asset into the anticipated combined fractional interest (1510). For example, validation module 1332 can combine existing fractional interest 1356 and purported additional fractional interest 1366 into anticipated combined fractional interest 1367.

Act 1503 includes comparing the individual's anticipated combined fractional interest and the maximum fractional ownership in the asset per individual (1511). For example, validation module 1332 can compare anticipated combined fractional interest 1367 and maximum (ownership) interest 1321. Act 1503 includes calculating that the individual's anticipated combined fractional interest is less the maximum fractional ownership in the asset per individual based on the comparison (1512). For example, validation module 1332 can calculate that anticipated combined fractional interest 136 is less than maximum (ownership) interest 1321. As such, transaction module 1331 can allow transaction 1317 to proceed without pausing or killing transaction 1317 (at least not for ownership reasons).

Aspects of the invention also include utilizing combinations of methods 1400 and 1500 together.

Each of the processes, methods, and algorithms described in the preceding sections may be embodied in, and fully or partially automated by, code components executed by one or more computer systems or computer processors comprising computer hardware. Each of the processes, methods, and algorithms described in the preceding sections may occur sequentially, partially sequentially, partially concurrently, or fully concurrently. For example, transaction monitoring service 902, transaction monitor 1331, etc. may have multiple transactions in different aspects of paused, unpaused, under human intervention/investigation, or killed at any time. Different portions of the processes, methods, and algorithms described in the preceding sections may occur sequentially, partially sequentially, partially concurrently, or fully concurrently. For example, transaction monitoring service 902, transaction monitor 1331, etc. may pause a transaction and concurrently request human intervention/investigation (and also concurrently with pausing, unpausing, or killing one or more other transactions)

The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits.

Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computer system 800. In example embodiments, system 100, system 1200, computer architecture 1300, etc. provide a throttle (pause/unpause) component suitable for use to pause and unpause certain activities, e.g., trades, on a financial exchange. Concurrently with pausing an activity, system 100, system 1200, computer architecture 1300, etc. can request human intervention/investigation. System 100, system 1200, computer architecture 1300, etc. also provide a kill switch component that is suitable for use to terminate activities, e.g., trading, on a financial exchange.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or activities.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

In one aspect, a method may include an operation, an instruction, and/or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An Alternative Trading System (ATS) computer-implemented method comprising:

processing transaction flows settling transactions at the ATS;

concurrently with processing transaction flows, automatically, continually, and electronically updating and maintaining a set of security action triggers that, when triggered, subject pre-settlement transactions at the ATS to one or more supplemental security actions prior to settlement approval, including:

tracking order frequency, timing, aggregate value and user attributes based on a set of factors, wherein the set of factors include: (1) a mid settlement consideration factor and (2) one or more "outside" factors selected from among: a significant regional incident, a significant national incident, a significant global incident, and government regulation affecting an asset value;

continually and automatically checking for non-compliance with the mid settlement consideration factor;

continually and automatically checking for non-compliance with an "outside" factor selected from among the one or more "outside" factors;

identifying non-compliance with a factor, from among: the mid settlement consideration factor and the "outside" factor, from the continual and automatic checking;

determining that the identified factor impacts pre-settlement transactions associated with specified transaction data in view of the tracked order frequency, timing, aggregate value, and user attributes; and responsive to determining that the identified factor impacts pre-settlement transactions associated with the specified transaction data, setting a flag denoting that pre-settlement transactions associated with the specified transaction data the one or more supplemental security actions prior to settlement; and concurrently with processing transaction flows settling transactions at the ATS and concurrently with automatically, continually, and electronically updating and maintaining the set of security action triggers, reviewing a transaction in response to triggering a security action trigger, including:

monitoring flow of a "live" transaction at the ATS, the "live" transaction being pre-settlement and including live transaction data defining exchange of a fractional interest in an asset between a buyer and a seller;

matching the live transaction data with the specified transaction data;

in response to the match:

interrupting flow of the "live" transaction from progressing towards settlement; and while interrupted, subjecting the "live" transaction to the one or more supplemental security actions in view of the set flag, the one or more supplemental security actions handling any transaction irregularities associated with the factor non-compliance; and (1) allowing the flow of the "live" transaction to resume and the "live" transaction to progress towards settlement subsequent to completion of the one or more supplemental security actions or (2) preventing the flow of the "live" transaction and stopping the "live" transaction from settling based on the one or more supplemental security actions.

2. The method of claim 1, wherein the set of factors including a mid settlement consideration factor comprises the set of factors including a timing issue factor or a volatility issue factor.

3. The method of claim 2, wherein the set of factors including a timing issue factor or a volatility issue factor comprises the set of factors including a cryptocurrency volatility.

4. The method of claim 2, wherein the set of factors including a timing issue factor or a volatility issue factor comprises the set of factors including blockchain congestion.

5. The method of claim 2, wherein the set of factors including a timing issue factor or a volatility issue factor comprises the set of factors including smart contract execution.

6. The method of claim 1, wherein the set of factors including a mid settlement consideration factor comprises the set of factors including a combination factor including one or more inside factors and one or more outside factors.

7. An Alternative Trading System (ATS) comprising:

a processor;

a system memory coupled to the processor and storing instructions, which, when executed, cause the processor to:

process transaction flows settling transactions at the ATS;

concurrently with processing transaction flows at the ATS, automatically, continually, and electronically updating and maintaining a set of security action triggers that, when triggered, subject pre-settlement transactions at the ATS to one or more supplemental security actions prior to settlement approval, including:

track order frequency, timing, aggregate value and user attributes based on a set of factors, wherein the set of factors include: (1) a mid settlement consideration factor and (2) one or more "outside" factors selected from among: a significant regional incident, a significant national incident, a significant global incident, and government regulation affecting an asset value;

continually and automatically check for non-compliance with the mid settlement consideration factor;

continually and automatically check for non-compliance with an "outside" factor selected from among the one or more "outside" factors;

identify non-compliance with a factor, from among: the mid settlement consideration factor and the "outside" factor, from the continual and automatic checking;

determine that the identified factor impacts pre-settlement transactions associated with specified transaction data in view of the tracked order frequency, timing, aggregate value, and user attributes;

responsive to determining that the identified factor impacts pre- settlement transactions associated with the specified transaction data, set a flag denoting that pre-settlement transactions associated with the specified transaction data the one or more supplemental security actions prior to settlement;

concurrently with processing transaction flows settling transactions at the ATS and concurrently with automatically, continually, and electronically updating and maintaining the set of security action triggers, review a transaction in response to triggering a security action trigger, including:

monitor flow of a "live" transaction at the ATS, the "live" transaction being pre-settlement and including live transaction data defining exchange of a fractional interest in an asset between a buyer and a seller;

match the live transaction data with the specified transaction data;

in response to the match:

interrupt flow of the "live" transaction from progressing towards settlement; and while interrupted, subject the "live" transaction to the one or more supplemental security actions in view of the set flag, the one or more supplemental security actions handling any transaction irregularities associated with the factor non-compliance; and (1) allow the flow of the "live" transaction to resume and the "live" transaction to progress towards settlement subsequent to completion of the one or more supplemental security actions or (2) prevent the flow of the "live" transaction and stopping the "live" transaction from settling based on the one or more supplemental security actions.

8. The system of claim 7, wherein the set of factors including a mid settlement consideration factor comprises the set of factors including a timing issue factor or a volatility issue factor.

9. The system of claim 8, wherein the set of factors including a timing issue factor or a volatility issue factor comprises the set of factors including a cryptocurrency volatility.

10. The system of claim 8, wherein the set of factors including a timing issue factor or a volatility issue factor comprises the set of factors including blockchain congestion.

11. The system of claim 8, wherein the set of factors including a timing issue factor or a volatility issue factor comprises the set of factors including smart contract execution.

12. The system of claim 7, wherein the set of factors including a mid settlement consideration factor comprises the set of factors including a combination factor including one or more inside factors and one or more outside factors.

* * * * *